(12) United States Patent
Kawabe et al.

(10) Patent No.: US 11,555,636 B2
(45) Date of Patent: Jan. 17, 2023

(54) HEAT REQUEST ARBITRATION DEVICE, HEAT REQUEST ARBITRATION METHOD, NON-TRANSITORY STORAGE MEDIUM, AND VEHICLE

(71) Applicant: TOYOTA JIDOSHA KABUSHIKI KAISHA, Toyota (JP)

(72) Inventors: Takayuki Kawabe, Toyota (JP); Ryuichi Wada, Nagoya (JP); Makoto Ikegami, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 17/171,163

(22) Filed: Feb. 9, 2021

(65) Prior Publication Data

US 2021/0285699 A1    Sep. 16, 2021

(30) Foreign Application Priority Data

Mar. 16, 2020 (JP) .............................. JP2020-045615

(51) Int. Cl.
*B60H 1/00* (2006.01)
*F25B 25/00* (2006.01)
*B60H 1/32* (2006.01)

(52) U.S. Cl.
CPC ....... *F25B 25/005* (2013.01); *B60H 1/00278* (2013.01); *B60H 1/32284* (2019.05); *B60H 2001/00307* (2013.01); *B60H 2001/00928* (2013.01); *B60H 2001/00949* (2013.01); *F25B 2339/047* (2013.01)

(58) Field of Classification Search
CPC ............ F25B 25/005; F25B 2339/047; B60H 1/32284; B60H 1/00278; B60H 2001/00307; B60H 2001/00928; B60H 2001/00949
USPC ....................................................... 165/202
See application file for complete search history.

(56) References Cited

U.S. PATENT DOCUMENTS

2016/0031291 A1\* 2/2016 Enomoto ................ B60L 58/26
62/189
2016/0153343 A1\* 6/2016 Kakehashi ......... B60H 1/00885
123/41.31
2016/0318499 A1  11/2016 Yamanaka et al.
(Continued)

FOREIGN PATENT DOCUMENTS

DE   102018117099 A1   1/2020
EP      3118035 A1     1/2017
(Continued)

*Primary Examiner* — Davis D Hwu
(74) *Attorney, Agent, or Firm* — Oliff PLC

(57) ABSTRACT

A heat request arbitration device includes: a first thermal circuit; a second thermal circuit; a third thermal circuit having path patterns that are selectable as a path that is heat exchangeable with each of the first thermal circuit and the second thermal circuit; and heat source units configured to absorb heat or radiate heat via a heat medium circulating in at least one of the thermal circuits; a derivation unit configured to derive requests related to heat flow control of heat absorbed or radiated by each of the heat source units; and a selection unit configured to select a path for at least one of the thermal circuits so as to satisfy at least one of the requests related to the heat flow control based on the requests related to the heat flow control derived by the derivation unit.

9 Claims, 15 Drawing Sheets

(56) References Cited

U.S. PATENT DOCUMENTS

2017/0021698 A1     1/2017    Hatakeyama et al.
2019/0375270 A1*   12/2019   Boger ................ B60H 1/00392

FOREIGN PATENT DOCUMENTS

| JP | 2006-321389 A | 11/2006 |
|---|---|---|
| JP | 2015-186989 A | 10/2015 |
| WO | 2015/107589 A1 | 7/2015 |

* cited by examiner

FIG. 5
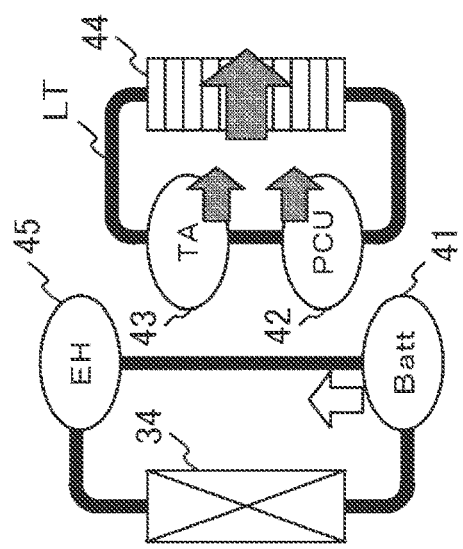
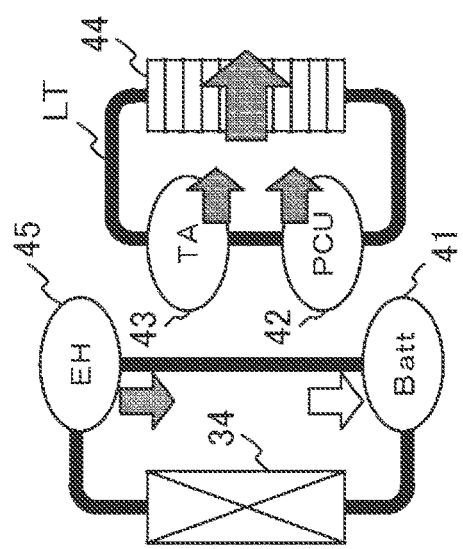
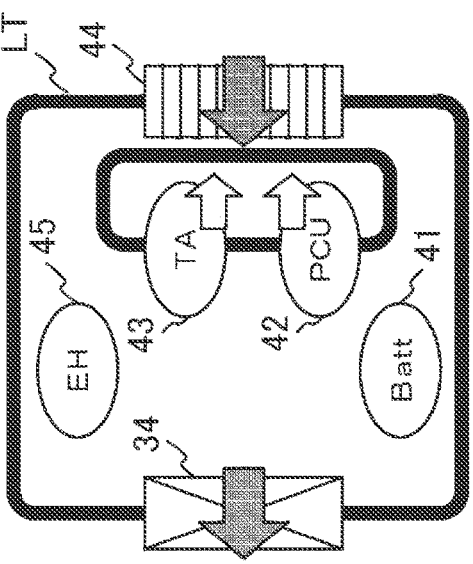
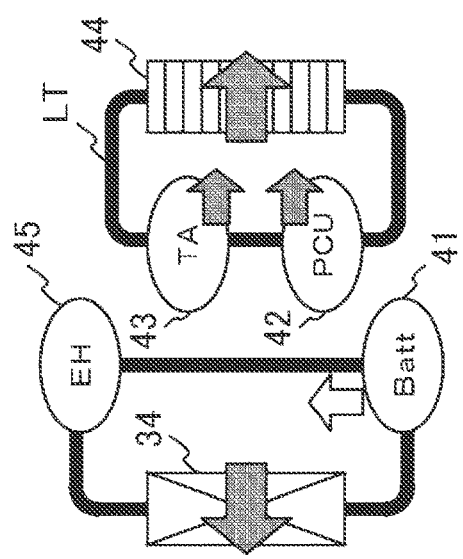
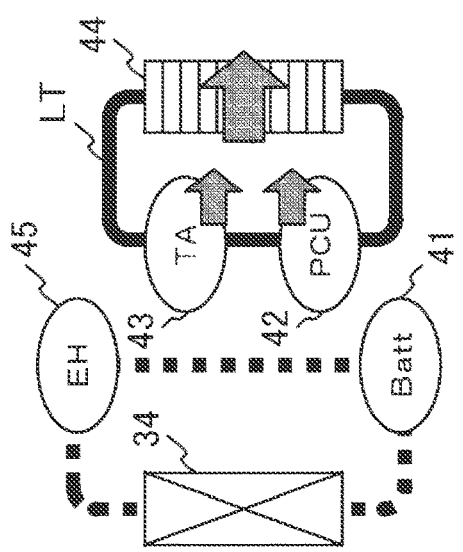

FIG. 6

| PATH PATTERN OF LOW TEMPERATURE COOLING CIRCUIT LT / HEAT FLOW CONTROL REQUEST | | A-1 | A-2 | A-3 | B-1 | C-1 |
|---|---|---|---|---|---|---|
| FIRST | WATER FLOW REQUESTED | ● | ● | ● | ● | |
| | NO WATER FLOW REQUESTED | ● | ● | ● | ● | ● |
| | TEMPERATURE RISE PERMISSION | | ● | | | ● |
| | COOLING PROHIBITION | | | | ● | |
| SECOND | TEMPERATURE EQUALIZATION (USE OF EXHAUST HEAT PROHIBITED) | ● | | ● | | |
| | TEMPERATURE EQUALIZATION (USE OF EXHAUST HEAT PERMITTED) | ● | | ● | | |
| | NO RESTRICTIONS | ● | | ● ● | ● | ● |
| | COOLING PERMISSION (LIFE) | ● | ● | ● | ● | |
| | COOLING PERMISSION (EMERGENCY) | ● | ● | ● | ● | ● |
| THIRD | HEATING (OUTSIDE AIR HP PERMITTED) | ● | ● | ● | ● | |
| | HEATING (OUTSIDE AIR HP PROHIBITED) | ● | ● | ● | ● | ● |
| | DEHUMIDIFYING HEATING (OUTSIDE AIR HP PERMITTED) | ● | ● | ● | ● | |
| | DEHUMIDIFYING HEATING (OUTSIDE AIR HP PROHIBITED) | ● | ● | ● | ● | |
| | COOLING | ● ● | ● | ● | ● | |
| | AIR CONDITIONING OFF | ● | ● | ● | ● | |

FIG. 7

| HEAT FLOW CONTROL REQUEST | | PATH PATTERN OF REFRIGERANT CIRCUIT RE | | | | | |
|---|---|---|---|---|---|---|---|
| | | A-1 | B-1 | B-2 | C-1 | D-1 | D-2 |
| FIRST | WATER FLOW REQUESTED | ● | ● | ● | ● | ● | ● |
| | NO WATER FLOW REQUESTED | ● | ● | ● | ● | ● | ● |
| | TEMPERATURE RISE PERMISSION | ● | ● | | ● | ● | |
| | COOLING PROHIBITION | ● | | | ● | | |
| SECOND | TEMPERATURE EQUALIZATION (USE OF EXHAUST HEAT PROHIBITED) | ● | | | ● | | |
| | TEMPERATURE EQUALIZATION (USE OF EXHAUST HEAT PERMITTED) | ● | ● | ● | ● | ● | ● |
| | NO RESTRICTIONS | ● | ● | ● | ● | ● | ● |
| | COOLING PERMISSION (LIFE) | | | | | ● | ● |
| | COOLING PERMISSION (EMERGENCY) | | | | | | ● |
| THIRD | HEATING (OUTSIDE AIR HP PERMITTED) | ● | ● | ● | ● | ● | ● |
| | HEATING (OUTSIDE AIR HP PROHIBITED) | ● | ● | ● | ● | ● | ● |
| | DEHUMIDIFYING HEATING (OUTSIDE AIR HP PERMITTED) | | | ● | | | |
| | DEHUMIDIFYING HEATING (OUTSIDE AIR HP PROHIBITED) | | | ● | | | |
| | COOLING | | | | ● | | |
| | AIR CONDITIONING OFF | | | | | | ● |

FIG. 8

| HEAT FLOW CONTROL REQUEST | PATH PATTERN OF HIGH TEMPERATURE COOLING CIRCUIT HT | A-1 | A-2 | A-3 | B-1 | C-1 | D-1 |
|---|---|---|---|---|---|---|---|
| FIRST | WATER FLOW REQUESTED | ● | ● | ● | ● | ● | ● |
| FIRST | NO WATER FLOW REQUESTED | ● | ● | ● | ● | ● | ● |
| FIRST | TEMPERATURE RISE PERMISSION | ● | ● | ● | ● | ● | ● |
| FIRST | COOLING PROHIBITION | ● | ● | ● | ● | ● | ● |
| SECOND | TEMPERATURE EQUALIZATION (USE OF EXHAUST HEAT PROHIBITED) | ● | ● | ● | ● | ● | ● |
| SECOND | TEMPERATURE EQUALIZATION (USE OF EXHAUST HEAT PERMITTED) |  |  | ● | ● | ● |  |
| SECOND | NO RESTRICTIONS | ● | ● | ● | ● | ● | ● |
| SECOND | COOLING PERMISSION (LIFE) | ● | ● | ● | ● | ● |  |
| SECOND | COOLING PERMISSION (EMERGENCY) |  |  | ● | ● | ● |  |
| THIRD | HEATING (OUTSIDE AIR HP PERMITTED) | ● | ● | ● | ● |  |  |
| THIRD | HEATING (OUTSIDE AIR HP PROHIBITED) | ● | ● | ● | ● |  |  |
| THIRD | DEHUMIDIFYING HEATING (OUTSIDE AIR HP PERMITTED) |  | ● | ● | ● |  |  |
| THIRD | DEHUMIDIFYING HEATING (OUTSIDE AIR HP PROHIBITED) |  | ● | ● | ● |  |  |
| THIRD | COOLING |  |  |  |  | ● |  |
| THIRD | AIR CONDITIONING OFF |  |  |  |  | ● | ● |

FIG. 13

< LOW TEMPERATURE COOLING CIRCUIT LT >

| PATH PATTERN | WATER FLOW REQUESTED | TEMPERATURE RISE PERMISSION | HEATING (OUTSIDE AIR HP PERMITTED) | EXTRACTED NUMBER | SELECTION |
|---|---|---|---|---|---|
| A-1 | ● |   | ● | 2 |   |
| A-2 | ● | ● | ● | 3 | ◎ |
| A-3 | ● |   | ● | 2 |   |
| B-1 | ● |   | ● | 2 |   |
| C-1 |   |   | ● | 1 |   |

< REFRIGERANT CIRCUIT RE >

| PATH PATTERN | WATER FLOW REQUESTED | TEMPERATURE RISE PERMISSION | HEATING (OUTSIDE AIR HP PERMITTED) | EXTRACTED NUMBER | SELECTION |
|---|---|---|---|---|---|
| A-1 | ● | ● |   | 2 |   |
| B-1 | ● |   |   | 1 |   |
| B-2 | ● |   |   | 1 |   |
| C-1 | ● | ● | ● | 3 | ◎ |
| D-1 | ● |   | ● | 2 |   |
| D-2 | ● |   | ● | 2 |   |

< HIGH TEMPERATURE COOLING CIRCUIT HT >

| PATH PATTERN | WATER FLOW REQUESTED | TEMPERATURE RISE PERMISSION | HEATING (OUTSIDE AIR HP PERMITTED) | EXTRACTED NUMBER | SELECTION |
|---|---|---|---|---|---|
| A-1 | ● | ● | ● | 3 | ◎ |
| A-2 | ● | ● | ● | 3 |   |
| A-3 | ● | ● | ● | 3 |   |
| B-1 | ● | ● | ● | 3 |   |
| C-1 | ● | ● |   | 2 |   |
| D-1 | ● | ● |   | 2 |   |

FIG. 14

< LOW TEMPERATURE COOLING CIRCUIT LT >

| PATH PATTERN | WATER FLOW REQUESTED | NO RESTRICTIONS | HEATING (OUTSIDE AIR HP PERMITTED) | EXTRACTED NUMBER | SELECTION |
|---|---|---|---|---|---|
| A-1 | ● | ● | | 3 | |
| A-2 | ● | | ● | 2 | |
| A-3 | ● | ● | ● | 3 | ◎ |
| B-1 | ● | ● | ● | 3 | |
| C-1 | ● | | ● | 2 | |

< REFRIGERANT CIRCUIT RE >

| PATH PATTERN | WATER FLOW REQUESTED | NO RESTRICTIONS | HEATING (OUTSIDE AIR HP PERMITTED) | EXTRACTED NUMBER | SELECTION |
|---|---|---|---|---|---|
| A-1 | ● | ● | | 2 | |
| B-1 | ● | ● | | 2 | |
| B-2 | ● | | | 1 | |
| C-1 | ● | ● | ● | 3 | |
| D-1 | ● | ● | ● | 3 | ◎ |
| D-2 | ● | | ● | 2 | |

< HIGH TEMPERATURE COOLING CIRCUIT HT >

| PATH PATTERN | WATER FLOW REQUESTED | NO RESTRICTIONS | HEATING (OUTSIDE AIR HP PERMITTED) | EXTRACTED NUMBER | SELECTION |
|---|---|---|---|---|---|
| A-1 | ● | ● | ● | 3 | ○ |
| A-2 | ● | ● | ● | 3 | ○ |
| A-3 | ● | ● | ● | 3 | ○ |
| B-1 | ● | ● | | 2 | |
| C-1 | ● | ● | | 2 | |
| D-1 | ● | | | | |

FIG. 15

< LOW TEMPERATURE COOLING CIRCUIT LT >

| PATH PATTERN | NO WATER FLOW REQUESTED | TEMPERATURE EQUALIZATION (USE OF EXHAUST HEAT PERMITTED) | COOLING | EXTRACTED NUMBER | SELECTION |
|---|---|---|---|---|---|
| A-1 | ● | ● | ● | 3 | |
| A-2 | ● | | ● | 2 | |
| A-3 | ● | ● | ● | 3 | ◎ |
| B-1 | ● | | ● | 2 | |
| C-1 | ● | | | 1 | |

< REFRIGERANT CIRCUIT RE >

| PATH PATTERN | NO WATER FLOW REQUESTED | TEMPERATURE EQUALIZATION (USE OF EXHAUST HEAT PERMITTED) | COOLING | EXTRACTED NUMBER | SELECTION |
|---|---|---|---|---|---|
| A-1 | ● | ● | ● | 3 | ◎ |
| B-1 | ● | ● | | 2 | |
| B-2 | ● | | ● | 2 | |
| C-1 | ● | ● | | 2 | |
| D-1 | ● | ● | | 2 | |
| D-2 | ● | | | 1 | |

< HIGH TEMPERATURE COOLING CIRCUIT HT >

| PATH PATTERN | NO WATER FLOW REQUESTED | TEMPERATURE EQUALIZATION (USE OF EXHAUST HEAT PERMITTED) | COOLING | EXTRACTED NUMBER | SELECTION |
|---|---|---|---|---|---|
| A-1 | ● | ● | | 2 | |
| A-2 | ● | ● | | 2 | |
| A-3 | ● | ● | | 2 | |
| B-1 | ● | ● | | 2 | |
| C-1 | ● | ● | ● | 3 | ◎ |
| D-1 | ● | ● | | 2 | |

HEAT REQUEST ARBITRATION DEVICE, HEAT REQUEST ARBITRATION METHOD, NON-TRANSITORY STORAGE MEDIUM, AND VEHICLE

CROSS-REFERENCE TO RELATED APPLICATION

This application claims priority to Japanese Patent Application No. 2020-045615 filed on Mar. 16, 2020, incorporated herein by reference in its entirety.

BACKGROUND

1. Technical Field

The present disclosure relates to a heat request arbitration device, a heat request arbitration method, a non-transitory storage medium, and a vehicle.

2. Description of Related Art

Japanese Unexamined Patent Application Publication No. 2015-186989 (JP 2015-186989 A) describes a vehicle air conditioner that includes a refrigeration circuit, a low water temperature circuit, and a high water temperature circuit. In the vehicle air conditioner, the refrigeration circuit and the high water temperature circuit can exchange heat via a water cooling condenser, and the refrigeration circuit and the low water temperature circuit can exchange heat via a refrigerant-water heat exchanger. The vehicle air conditioner described in JP 2015-186989 A is provided with a subcool (SC) condenser that can exchange heat between the refrigeration circuit and the low water temperature circuit, and the SC condenser promotes cooling of the refrigerant in the refrigeration circuit to improve the efficiency of the refrigeration circuit.

SUMMARY

The vehicle air conditioner described in JP 2015-186989 A controls the thermal circuits in the order of priority of a cooling request, a heating request, and a battery charging (heating) request that are requested from a heat source unit. Thus, when a plurality of requests such as a cooling request and a battery charging request occur, the cooling request is prioritized, and as a result, heat flow control for battery charging may not be effectively performed. As described above, there is room for improvement in the heat flow control for satisfying all the requests when a plurality of requests occur.

The present disclosure provides a heat request arbitration device and the like capable of performing suitable heat flow control that can easily satisfy a plurality of requests.

A first aspect of the present disclosure is a heat request arbitration device mounted on a vehicle. The heat request arbitration device includes: a first thermal circuit having a plurality of path patterns that are selectable as a path configured to circulate a coolant at a high temperature; a second thermal circuit having a plurality of path patterns that are selectable as a path configured to circulate a coolant at a low temperature; a third thermal circuit having a plurality of path patterns that are selectable as a path that is heat exchangeable with each of the first thermal circuit and the second thermal circuit by circulating a refrigerant while changing a state of the refrigerant; a plurality of heat source units configured to absorb heat or radiate heat via a heat medium circulating in at least one of the first thermal circuit, the second thermal circuit, and the third thermal circuit; a derivation unit; and a selection unit. The derivation unit is configured to derive a plurality of requests related to heat flow control of heat absorbed or radiated by each of the heat source units. The selection unit is configured to select a path for at least one of the first thermal circuit, the second thermal circuit, and the third thermal circuit so as to satisfy at least one of the requests related to the heat flow control based on the requests related to the heat flow control derived by the derivation unit.

In the first aspect, the first thermal circuit and the third thermal circuit may be coupled via a first heat exchanger. The second thermal circuit and the third thermal circuit may be coupled via a second heat exchanger. The selection unit may be configured to select at least one mode of heat transfer control of the first heat exchanger and the second heat exchanger so as to satisfy at least one of the requests related to the heat flow control based on the requests related to the heat flow control derived by the derivation unit.

In the first aspect, the derivation unit may be configured to derive a plurality of requests related to states of the heat source units that differ from each other and that are mounted on the vehicle as the requests related to the heat flow control.

In the first aspect, the requests related to the heat flow control may include at least a first request, a second request, and a third request. The first request is a request for a water flow state of a radiator that is one of the heat source units. The second request is a request for a temperature state of a battery that is one of the heat source units. The third request is a request for an air-conditioning state in a vehicle cabin that involves at least an operation of an evaporator that is one of the heat source units.

In the first aspect, a priority may be given to each of the first request, the second request, and the third request. The selection unit may be configured to make a selection based on the priority so as to satisfy at least a request having a higher priority.

In the first aspect, the priority may be higher in the second request than in the third request, and may be higher in the first request than in the second request.

In the first aspect, the selection unit may be configured to make a selection based on electric power consumed by the heat source units.

A second aspect of the present disclosure is a heat request arbitration method executed by a computer of a heat request arbitration device mounted on a vehicle including a first thermal circuit, a second thermal circuit, a third thermal circuit, and a plurality of heat source units. The first thermal circuit has a plurality of path patterns that are selectable as a path configured to circulate a coolant at a high temperature. The second thermal circuit has a plurality of path patterns that are selectable as a path configured to circulate a coolant at a low temperature. The third thermal circuit has a plurality of path patterns that are selectable as a path that is heat exchangeable with each of the first thermal circuit and the second thermal circuit by circulating a refrigerant while changing a state of the refrigerant. The heat source units are configured to absorb heat or radiate heat via a heat medium circulating in at least one of the first thermal circuit, the second thermal circuit, and the third thermal circuit. The heat request arbitration method includes deriving a plurality of requests related to heat flow control of heat absorbed or radiated by each of the heat source units, and selecting a path for at least one of the first thermal circuit, the second thermal circuit, and the third thermal circuit so as to satisfy at least one of the requests related to the heat flow control based on the requests related to the heat flow control that are derived.

A third aspect of the present disclosure is a non-transitory storage medium storing instructions that are executable by one or more processors of a heat request arbitration device mounted on a vehicle including a first thermal circuit, a second thermal circuit, a third thermal circuit and a plurality of heat source units, and the instructions that cause the one or more processors to perform functions. The first thermal circuit has a plurality of path patterns that are selectable as a path configured to circulate a coolant at a high temperature. The second thermal circuit has a plurality of path patterns that are selectable as a path configured to circulate a coolant at a low temperature. The third thermal circuit has a plurality of path patterns that are selectable as a path that is heat exchangeable with each of the first thermal circuit and the second thermal circuit by circulating a refrigerant while changing a state of the refrigerant. The heat source units are configured to absorb heat or radiate heat via a heat medium circulating in at least one of the first thermal circuit, the second thermal circuit, and the third thermal circuit. The functions include: deriving a plurality of requests related to heat flow control of heat absorbed or radiated by each of the heat source units; and selecting a path for at least one of the first thermal circuit, the second thermal circuit, and the third thermal circuit so as to satisfy at least one of the requests related to the heat flow control based on the requests related to the heat flow control that are derived.

A fourth aspect of the present disclosure is a vehicle including a heat request arbitration device. The heat request arbitration device includes: a first thermal circuit having a plurality of path patterns that are selectable as a path configured to circulate a coolant at a high temperature; a second thermal circuit having a plurality of path patterns that are selectable as a path configured to circulate a coolant at a low temperature; a third thermal circuit having a plurality of path patterns that are selectable as a path that is heat exchangeable with each of the first thermal circuit and the second thermal circuit by circulating a refrigerant while changing a state of the refrigerant; a plurality of heat source units configured to absorb heat or radiate heat via a heat medium circulating in at least one of the first thermal circuit, the second thermal circuit, and the third thermal circuit; a derivation unit; and a selection unit. The derivation unit is configured to derive a plurality of requests related to heat flow control of heat absorbed or radiated by each of the heat source units. The selection unit is configured to select a path for at least one of the first thermal circuit, the second thermal circuit, and the third thermal circuit so as to satisfy at least one of the requests related to the heat flow control based on the requests related to the heat flow control derived by the derivation unit.

According to the first aspect, the second aspect, the third aspect, and the fourth aspect of the present disclosure, since the optimum path is selected from a plurality of path patterns of the thermal circuits based on a plurality of requests related to heat flow control, it is possible to perform suitable heat flow control that can easily satisfy the requests related to the heat flow control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram showing a plurality of path patterns set for a low temperature cooling circuit;

FIG. 6 is a diagram showing a correspondence map regarding the path patterns of the low temperature cooling circuit;

FIG. 7 is a diagram showing a correspondence map regarding the path patterns of the refrigerant circuit;

FIG. 8 is a diagram showing a correspondence map regarding the path patterns of the high temperature cooling circuit;

FIG. 13 is a specific example (first example) of selecting a path pattern of each thermal circuit;

FIG. 14 is a specific example (second example) of selecting the path pattern of each thermal circuit; and FIG. 15 is a specific example (third example) of selecting the path pattern of each thermal circuit.

DETAILED DESCRIPTION OF EMBODIMENTS

The heat request arbitration device of the present disclosure selects a circulation path of a heat medium in each of the thermal circuits from a plurality of predetermined path patterns based on a plurality of requests related to heat flow control. With this selection control, it is possible to perform suitable heat flow control that can easily satisfy the requests related to the heat flow control.

Hereinafter, an embodiment of the present disclosure will be described in detail with reference to the drawings, taking as an example a case where the heat request arbitration device is mounted on a vehicle.

EMBODIMENT

Overall Configuration

Figure 1:
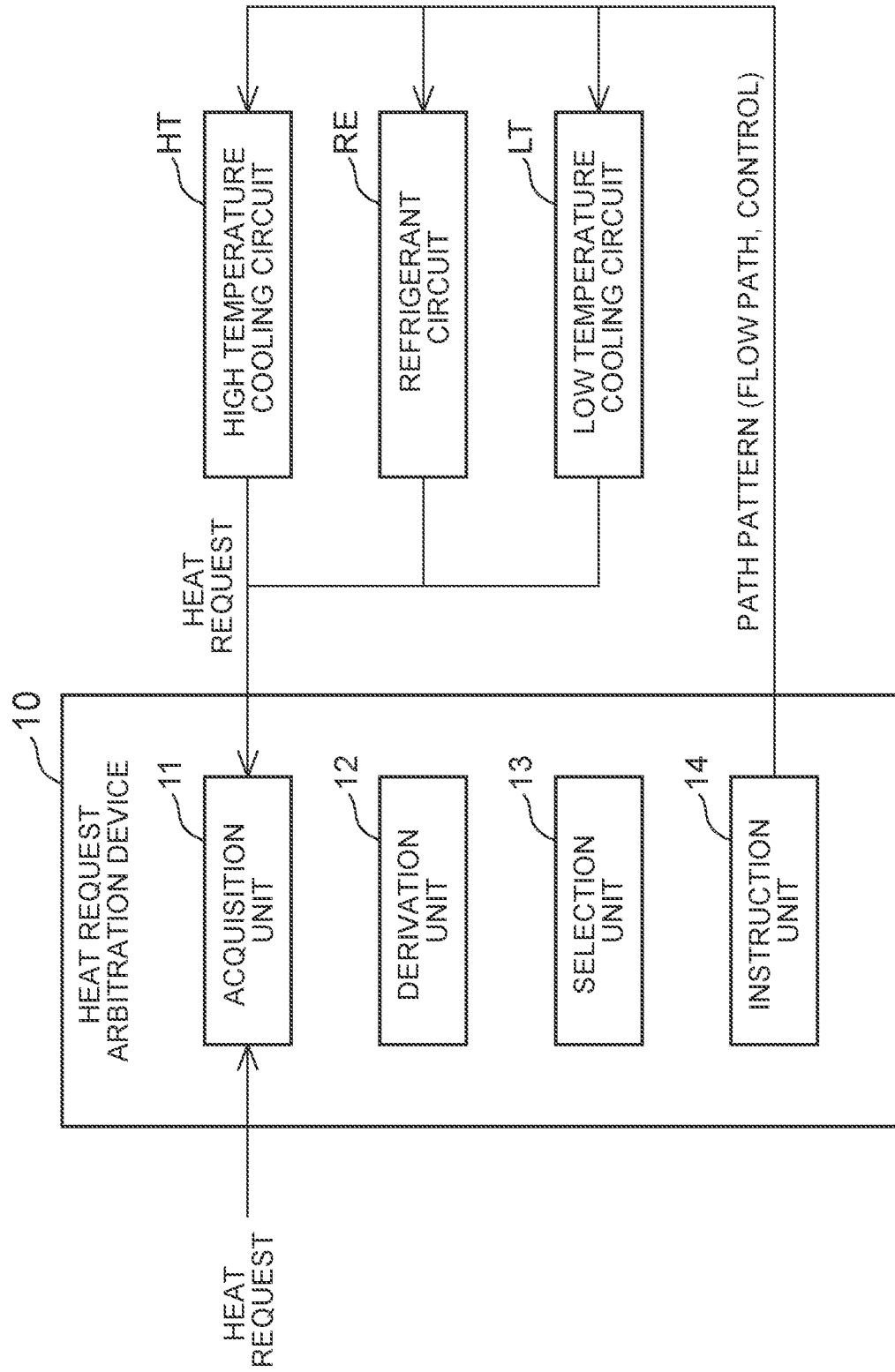
FIG. 1 is a functional block diagram showing a schematic configuration of a heat request arbitration device and thermal circuits according to an embodiment.

FIG. 1 is a functional block diagram showing a schematic configuration of a heat request arbitration device and thermal circuits according to the embodiment of the present disclosure.

A heat request arbitration device 10 is mounted on a vehicle having three thermal circuits of a high temperature cooling circuit HT, a low temperature cooling circuit LT, and a refrigerant circuit RE, and is a device that arbitrates requests related to heat from a unit included in each thermal circuit and a unit other than the thermal circuits. The heat request arbitration device 10 can communicate with a control device of a unit included in each thermal circuit or a unit other than the thermal circuits via an in-vehicle network such as a Controller Area Network (CAN). The high temperature cooling circuit HT, the low temperature cooling circuit LT, and the refrigerant circuit RE each have a flow path for circulating a heat medium. The unit included in each thermal circuit can exchange heat with the heat medium. Further, the refrigerant circuit RE is coupled to each of the high temperature cooling circuit HT and the low temperature cooling circuit LT so that the refrigerant circuit RE can exchange heat with each of the high temperature cooling circuit HT and the low temperature cooling circuit LT.

The heat request arbitration device 10 includes an acquisition unit 11, a derivation unit 12, a selection unit 13, and an instruction unit 14. The acquisition unit 11 acquires heat-related information by communication from a control device of a plurality of units included in the thermal circuits or a unit other than the thermal circuits. The derivation unit 12 derives a request (hereinafter referred to as "heat flow control request") regarding heat flow control of heat absorbed or radiated by each heat source unit (described later) based on the heat-related information acquired by the acquisition unit 11. The derivation unit 12 of the present embodiment derives a plurality of requests related to the states of a plurality of different heat source units mounted on the vehicle as heat flow control requests. The selection unit 13 determines an operation content of at least one of the high temperature cooling circuit HT, the low temperature cooling circuit LT, and the refrigerant circuit RE, preferably the operation content of all the above circuits so as to satisfy at least one of the heat flow control requests, preferably all of the requests, based on the plurality of the heat flow control requests derived by the derivation unit 12. The operation content is determined by selecting one path pattern for each thermal circuit from a plurality of path patterns (described later) preset for each thermal circuit. The instruction unit 14 instructs each thermal circuit to operate based on the path pattern selected by the selection unit 13.

Figure 2:
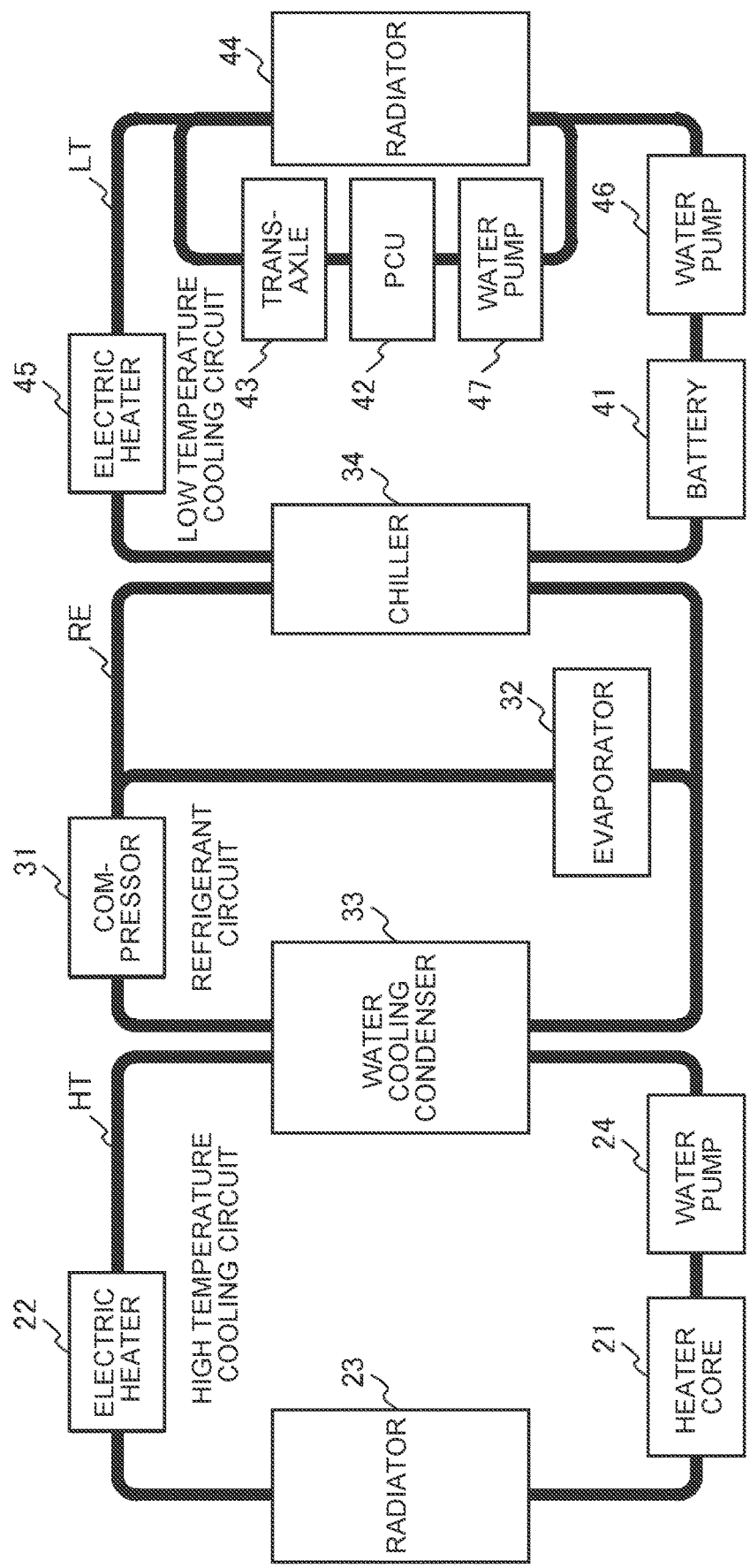
FIG. 2 is a block diagram showing a configuration example of the thermal circuit shown in FIG. 1.

FIG. 2 is a block diagram showing a configuration example of the high temperature cooling circuit HT, the low temperature cooling circuit LT, and the refrigerant circuit RE shown in FIG. 1. In FIG. 2, the flow path through which the heat medium circulates in each thermal circuit is indicated by a bold line.

The high temperature cooling circuit HT is a circuit that circulates a coolant as a heat medium, and is a first thermal circuit including a heater core 21, an electric heater 22, a radiator 23, and a water pump 24. The high temperature cooling circuit HT has a function of storing heat in the coolant for heating the vehicle cabin and a function of radiating heat received from the refrigerant circuit RE by heat exchange to the outside of the vehicle. The heater core 21 is a unit that has a tube through which the coolant flows and fins and that exchanges heat between the air passing through the fins and the coolant. The electric heater 22 is a unit that heats the coolant when the temperature of the coolant is not high enough. The radiator 23 is a unit for air-cooling the coolant. The radiator 23 has a radiator core, a grill shutter, and a radiator fan. The radiator core has a tube through which the coolant flows and fins, and exchanges heat between the air passing through the fins and the coolant. The grill shutter is disposed in front of the radiator core and increases or decreases the amount of ventilation to the radiator core. The radiator fan is disposed behind the radiator core and forcibly ventilates the radiator core. The water pump 24 is a unit that circulates the coolant.

In the high temperature cooling circuit HT, the heater core 21 and the radiator 23 are heat source units capable of absorbing heat from the coolant. The electric heater 22 is a heat source unit capable of exhausting heat to the coolant. The water pump 24 itself is not a heat source and does not absorb nor exhaust heat, but is a unit that can change the heat radiation amount of the radiator 23 and the amount of heat transferred from the refrigerant circuit RE via a water cooling condenser 33 described later, based on the flow velocity of the coolant.

The low temperature cooling circuit LT is a circuit that circulates the coolant as a heat medium, and is a second thermal circuit that includes a battery 41, a power control unit (hereinafter referred to as "PCU") 42, a transaxle (hereinafter referred to as "TA") 43, a radiator 44, an electric heater 45, and water pumps 46 and 47. The battery 41 is a unit that stores electric power to be supplied to the traveling motor. The PCU 42 is a unit including an inverter that drives the traveling motor and a direct current to direct current (DC-DC) converter that performs voltage conversion, and controls the electric power supplied to the traveling motor. The TA 43 is a unit in which the traveling motor, a generator, a power split device, and a transmission are integrated. The radiator 44 is a unit for cooling or heating the coolant with air. The radiator 44 has a radiator core, a grill shutter, and a radiator fan. The radiator core has a tube through which the coolant flows and fins, and exchanges heat between the air passing through the fins and the coolant. The grill shutter is disposed in front of the radiator core and increases or decreases the amount of ventilation to the radiator core. The radiator fan is disposed behind the radiator core and forcibly ventilates the radiator core. The electric heater 45 is a unit that heats the coolant when the temperature of the coolant is not high enough. The water pumps 46 and 47 are units for circulating the coolant.

In the low temperature cooling circuit LT, the radiator 44 is a heat source unit capable of absorbing heat from the coolant (during normal operation) and exhausting heat to the coolant (during operation of the outside air heat pump). The battery 41, the PCU 42, and the TA 43 are heat source units capable of exhausting heat to the coolant via a water jacket that constitutes a part of the flow path of the coolant. The electric heater 45 is a heat source unit capable of exhausting heat to the coolant. The water pumps 46 and 47 themselves are not heat sources and do not absorb heat nor exhaust heat, but are units that can control the amount of exhaust heat from the battery 41, the PCU 42, and the TA 43 to the coolant, the heat radiation amount and the heat absorption amount of the radiator 44, and the amount of heat transferred to the refrigerant circuit RE via a chiller 34 described later, based on the flow velocity of the coolant. Since the low temperature cooling circuit LT is provided in principle to cool the battery 41, the PCU 42, and the TA 43 to ensure reliability, the temperature of the coolant circulating in the low temperature cooling circuit LT is usually kept lower than the temperature of the coolant circulating in the high temperature cooling circuit HT.

The refrigerant circuit RE is a circuit that circulates the refrigerant that is a heat medium while changing its state, and is a third thermal circuit including a compressor 31, an evaporator 32, a water cooling condenser 33, and the chiller 34. In the refrigerant circuit RE, the refrigerant compressed by the compressor 31 is condensed by the water cooling condenser 33, and the condensed refrigerant is injected into the evaporator 32 from an expansion valve provided in the evaporator 32 to expand the refrigerant, so that heat can be absorbed from the air surrounding the evaporator 32. In the refrigerant circuit RE, the compressor 31 and the evaporator 32 are heat source units capable of exhausting heat to the refrigerant. The water cooling condenser 33 is a heat source unit (first heat exchanger) capable of absorbing heat from the refrigerant and exhausting heat to the coolant of the high temperature cooling circuit HT. The chiller 34 is a heat source unit (second heat exchanger) capable of absorbing heat from the coolant of the low temperature cooling circuit LT and exhausting heat to the refrigerant.

The refrigerant circuit RE is coupled to the low temperature cooling circuit LT via the chiller 34 so that the refrigerant circuit RE can exchange heat with the low temperature cooling circuit LT, and heat generated in the low temperature cooling circuit LT can be transferred to the refrigerant circuit RE via the chiller 34. Further, the refrigerant circuit RE is coupled to the high temperature cooling circuit HT via the water cooling condenser 33 so that the refrigerant circuit RE can exchange heat with the high temperature cooling circuit HT, and can transfer heat generated in the refrigerant circuit RE and/or heat transferred from the low temperature cooling circuit LT to the refrigerant circuit RE to the high temperature cooling circuit HT via the water cooling condenser 33.

Although the thermal circuits mounted on an electric vehicle (EV) has been described as an example in FIG. 2, the heat request arbitration device 10 according to the present embodiment can also be applied to a hybrid vehicle (HV). In the case of a hybrid vehicle, the high temperature cooling circuit HT can be used to cool the engine.

Path Pattern of Thermal Circuit

Figure 3:
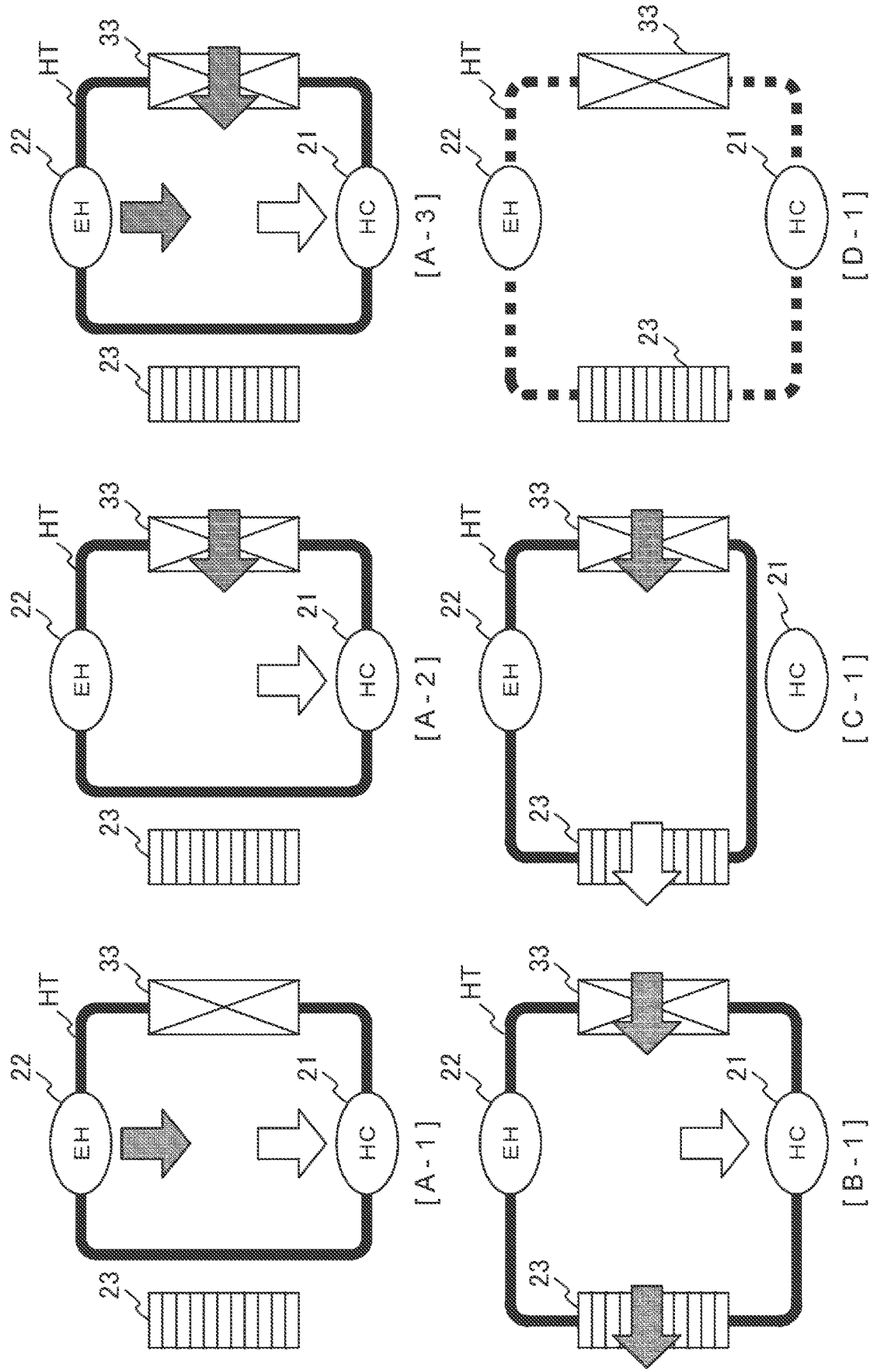
FIG. 3 is a diagram showing a plurality of path patterns set for a high temperature cooling circuit.
Figure 4:
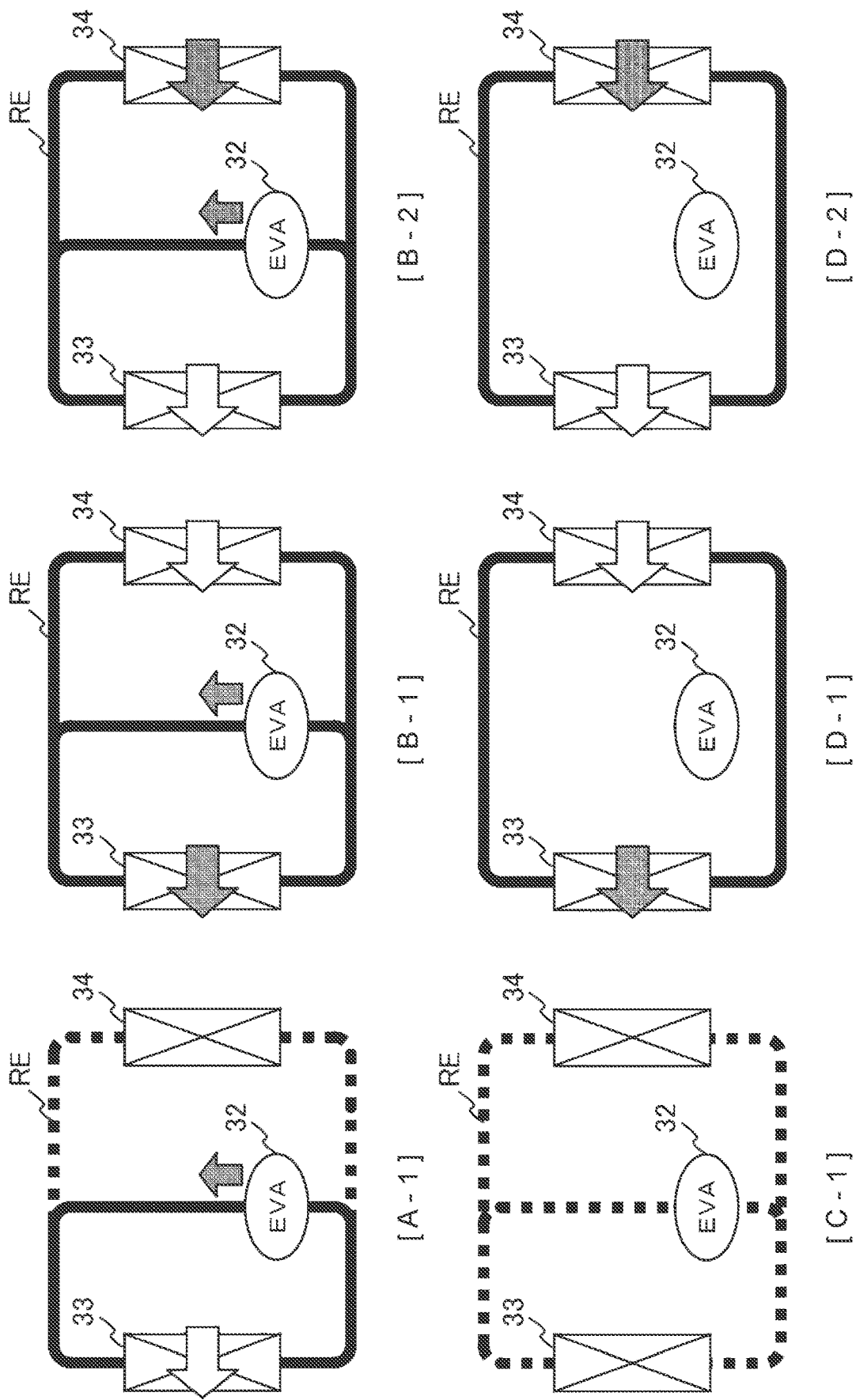
FIG. 4 is a diagram showing a plurality of path patterns set for a refrigerant circuit.

Next, with reference to FIGS. 3 to 5, a plurality of preset path patterns for the high temperature cooling circuit HT, the low temperature cooling circuit LT, and the refrigerant circuit RE will be described. FIG. 3 is a diagram showing a plurality of path patterns set for the high temperature cooling circuit HT. FIG. 4 is a diagram showing a plurality of path patterns set for the refrigerant circuit RE. FIG. 5 is a diagram showing a plurality of path patterns set for the low temperature cooling circuit LT. These path patterns are divided into a plurality of patterns based on the combination of the flow path of the heat medium and the mode of heat transfer control in each unit included in the thermal circuits.

(1) Path Pattern of High Temperature Cooling Circuit HT

In the high temperature cooling circuit HT, six types of path patterns shown in FIG. 3 are set to be selectable as paths capable of circulating the high temperature coolant. In FIG. 3, the water pump 24 that circulates the coolant is omitted.

The path pattern A-1 forms a flow path of the coolant by which the heater core (HC) 21, the electric heater (EH) 22, and the water cooling condenser 33 are connected. In the path pattern A-1, heat transfer control is performed in which the electric heater 22 is actively operated so that the electric heater 22 exhausts heat to the coolant (shaded arrow), and the heater core 21 absorbs heat from the coolant accordingly (white arrow). The water cooling condenser 33 is not operated.

In the path pattern A-2, the flow path of the coolant is the same as that of the path pattern A-1. In the path pattern A-2, heat transfer control is performed in which the water cooling condenser 33 is actively operated to exhaust heat from the refrigerant circuit RE to the coolant via the water cooling condenser 33 (shaded arrow), and the heater core (HC) 21 absorbs heat from the coolant (white arrow). Since the electric heater (EH) 22 is not operated, the electric heater 22 does not need to be connected to the flow path of the path pattern A-2.

In the path pattern A-3, the flow path of the coolant is the same as those of the path patterns A-1 and A-2. In the path pattern A-3, heat transfer control is performed in which the electric heater (EH) 22 is actively operated so that the electric heater 22 exhausts heat to the coolant (shaded arrow), the water cooling condenser 33 is actively operated to exhaust heat from the refrigerant circuit RE to the coolant via the water cooling condenser 33 (shaded arrow), and the heater core (HC) 21 absorbs heat from the coolant (white arrow).

The path pattern B-1 forms a flow path for the coolant by which the heater core (HC) 21, the electric heater (EH) 22, the radiator 23, and the water cooling condenser 33 are connected. In the path pattern B-1, control is performed in which the water cooling condenser 33 is actively operated to exhaust heat from the refrigerant circuit RE to the coolant via the water cooling condenser 33 (shaded arrow), and the heater core 21 absorbs heat from the coolant (white arrow). Further, heat transfer control is performed in which excessive heat supplied to the heater core 21 is actively exhausted to the outside air via the radiator 23 (shaded arrow). Since the electric heater 22 is not operated, the electric heater 22 does not need to be connected to the flow path of the path pattern B-1.

The path pattern C-1 forms a flow path of the coolant by which the electric heater (EH) 22, the radiator 23, and the water cooling condenser 33 are connected. In the path pattern C-1, heat transfer control is performed in which the water cooling condenser 33 is actively operated to exhaust heat from the refrigerant circuit RE to the coolant via the water cooling condenser 33 (shaded arrow), and heat accumulated in the coolant is exhausted to the outside air via the radiator 23 (white arrow). Since the electric heater 22 is not operated, the electric heater 22 does not need to be connected to the flow path of the path pattern C-1.

In the path pattern D-1, the heater core (HC) 21, the electric heater (EH) 22, the radiator 23, and the water cooling condenser 33 are not connected by the flow path of the coolant. In the path pattern D-1, heat transfer control is performed in which the heater core 21, the electric heater 22, the radiator 23, and the water cooling condenser 33 are not operated.

(2) Path Pattern of Refrigerant Circuit RE

In the refrigerant circuit RE, six types of path patterns shown in FIG. 4 are set to be selectable as paths capable of circulating the refrigerant while changing its state and exchanging heat with each of the high temperature cooling circuit HT and the low temperature cooling circuit LT. In FIG. 4, the compressor 31 that circulates the refrigerant is omitted.

The path pattern A-1 forms a flow path of the refrigerant by which the evaporator (EVA) 32 and the water cooling condenser 33 are connected. In the path pattern A-1, heat transfer control is performed in which the evaporator 32 is actively operated (shaded arrow). Heat of the refrigerant is exhausted to the high temperature cooling circuit HT via the water cooling condenser 33 (white arrow). The chiller 34 is not operated.

The path pattern B-1 forms a flow path of the refrigerant by which the evaporator (EVA) 32 and the water cooling condenser 33 are connected and a flow path of the refrigerant in which the water cooling condenser 33 and the chiller 34 are connected. In the path pattern B-1, heat transfer control is performed in which the evaporator 32 is actively operated (shaded arrow), and the water cooling condenser 33 actively exhausts heat to the high temperature cooling circuit HT (shaded arrow). Heat from the low temperature cooling circuit LT is exhausted to the refrigerant via the chiller 34 (white arrow).

In the path pattern B-2, the flow paths of the refrigerant is the same as those of the path pattern B-1. In the path pattern B-2, heat transfer control is performed in which the evaporator 32 is actively operated (shaded arrow), and heat is actively absorbed from the low temperature cooling circuit LT via the chiller 34 (shaded arrow). Heat of the refrigerant is exhausted to the high temperature cooling circuit HT via the water cooling condenser 33 (white arrow).

In the path pattern C-1, the evaporator (EVA) 32, the water cooling condenser 33, and the chiller 34 are not connected by the flow path of the refrigerant. In the path pattern C-1, heat transfer control is performed in which the evaporator 32, the water cooling condenser 33, and the chiller 34 are not operated.

The path pattern D-1 forms a flow path of the refrigerant by which the water cooling condenser 33 and the chiller 34 are connected. In the path pattern D-1, heat transfer control is performed in which heat is actively exhausted from the water cooling condenser 33 to the high temperature cooling circuit HT (shaded arrow). Heat from the low temperature cooling circuit LT is exhausted to the refrigerant via the chiller 34 (white arrow). The evaporator (EVA) 32 is not operated.

In the path pattern D-2, the flow path of the refrigerant is the same as that of the path pattern D-1. In the path pattern D-2, heat transfer control is performed in which heat is actively absorbed from the low temperature cooling circuit LT via the chiller 34 (shaded arrow). Heat of the refrigerant is exhausted to the high temperature cooling circuit HT via the water cooling condenser 33 (white arrow). The evaporator (EVA) 32 is not operated.

(3) Path Pattern of Low Temperature Cooling Circuit LT

In the low temperature cooling circuit LT, five types of path patterns shown in FIG. 5 are set to be selectable as paths capable of circulating low temperature coolant. In FIG. 5, the water pumps 46 and 47 that circulate the coolant are omitted.

The path pattern A-1 forms a flow path of the coolant by which the battery (Batt) 41, the electric heater (EH) 45, and the chiller 34 are connected, and a flow path of the coolant in which the PCU 42, the TA 43, and the radiator 44 are connected. In the path pattern A-1, heat transfer control is performed in which the chiller 34 is actively operated to exhaust heat of the battery 41 (white arrow) to the refrigerant circuit RE via the chiller 34 (shaded arrow). Further, heat transfer control is performed in which the radiator 44 is actively operated to exhaust heat of the PCU 42 and the TA 43 to the outside air via the radiator 44 (shaded arrow).

In the path pattern A-2, the flow paths of the coolant is the same as those of the path pattern A-1. In the path pattern A-2, heat transfer control is performed in which the electric heater (EH) 45 is actively operated so that the electric heater 45 exhausts heat to the coolant (shaded arrow), and the battery (Batt) 41 absorbs heat from the coolant (white arrow). Here, in order to efficiently transfer heat from the electric heater 45 to the battery 41, it is desirable to dispose the electric heater 45 immediately before the battery 41 in the flow path. Further, heat transfer control is performed in which the radiator 44 is actively operated to exhaust heat of the PCU 42 and the TA 43 to the outside air via the radiator 44 (shaded arrow). The chiller 34 is not operated.

In the path pattern A-3, the flow paths of the coolant is the same as those of the path patterns A-1 and A-2. In the path pattern A-3, temperature control of the battery (Batt) 41 is performed only by circulation of the coolant. Further, heat transfer control is performed in which the radiator 44 is actively operated to exhaust heat of the PCU 42 and the TA 43 to the outside air via the radiator 44 (shaded arrow). The electric heater (EH) 45 and the chiller 34 are not operated.

In the path pattern B-1, the battery (Batt) 41, the electric heater (EH) 45, and the chiller 34 are not connected by the flow path of the coolant, and only the flow path of the coolant by which the PCU 42, the TA 43, and the radiator 44 are connected is formed. In the path pattern B-1, heat transfer control is performed in which the electric heater 45 and the chiller 34 are not operated. That is, since the coolant is not circulated to the battery 41, cooling of the battery 41 is prohibited. Further, heat transfer control is performed in which the radiator 44 is actively operated to exhaust heat of the PCU 42 and the TA 43 to the outside air via the radiator 44 (shaded arrow).

The path pattern C-1 forms a flow path of the coolant by which the chiller 34 and the radiator 44 are connected and a flow path of the coolant in which the PCU 42 and the TA 43 are connected. In the path pattern C-1, heat transfer control is performed in which the radiator 44 is actively operated to exhaust the heat of the outside air to the coolant (shaded arrow), and the chiller 34 is actively operated to exhaust heat accumulated in the coolant to the refrigerant circuit RE via the chiller 34 (shaded arrow). Further, the PCU 42 and TA 43 are not connected to the radiator 44, and temperature control (white arrow) is performed only by circulation of the coolant.

Heat Flow Control Request

Next, a heat flow control request, which is a request related to heat flow control of heat absorbed or radiated by each of the heat source units of the vehicle, will be described. Examples of the heat source units of the vehicle include the radiator 44, the water cooling condenser 33, and the chiller 34 that are capable of absorbing and exhausting heat, the electric heater 22, the electric heater 45, the battery 41, the PCU 42, and the TA 43, that are capable of exhausting heat, the heater core 21, the radiator 23, and the evaporator 32 that are capable of absorbing heat.

In the present embodiment, as the heat flow control request for these heat source units, a request for the water flow state of the radiator 44 (hereinafter referred to as "first request"), a request for the temperature state of the battery 41 (hereinafter referred to as "second request"), and a request for the air-conditioning state in the vehicle cabin (hereinafter referred to as "third requirement") are derived. The heat flow control request is not limited to the above examples, and requests other than the first request, the second request, and the third request may be derived as long as the request is related to heat flow control of heat absorbed or radiated by the heat source unit.

(1) First Request

The following items can be exemplified as the first request for the water flow state of the radiator 44.

Water flow requested: a request to connect the flow path of the coolant for the PCU 42 and the TA 43 to the radiator 44

No water flow requested: a request that the flow path of the coolant for the PCU 42 and the TA 43 does not need to be connected to the radiator 44

In the present embodiment, the water flow state of the radiator 44 of the low temperature cooling circuit LT is given as an example, but the water flow state of the radiator 23 of the high temperature cooling circuit HT may also be applied.

(2) Second Request

The following items can be exemplified as the second request for the temperature state of the battery 41.

Temperature rise permission: a request to permit the temperature rise of the battery 41

Cooling prohibition: a request to prohibit the operation of cooling the battery 41

Temperature equalization (use of exhaust heat prohibited): a request to equalize the temperatures between a plurality of battery cells constituting the battery 41, and to prohibit the use of heat exhausted in the process of equalization in another thermal circuit Temperature equalization (use of exhaust heat permitted): a request to equalize the temperatures between a plurality of battery cells constituting the battery 41, and to permit the use of heat exhausted in the process of equalization in another thermal circuit No restrictions: a request indicating that there are no restrictions on the cooling and the temperature rise of the battery 41

Cooling permission (life): a request to permit cooling of the battery 41 to extend the life of the battery 41

Cooling permission (emergency): a request to instruct an operation to rapidly cool the battery 41

(3) Third Request

The following items can be exemplified as the third request for the air-conditioning state in the vehicle cabin, which involves at least the operation of the evaporator 32.

Heating (outside air HP permitted): a request to operate heating and to permit operation of a heat pump (HP) that absorbs heat of the outside air Heating (outside air HP prohibited): a request to operate heating and to prohibit HP operation Since only HP operation is prohibited, heating using an electric heater or heating using the exhaust heat of a battery is permitted.

Dehumidifying heating (outside air HP permitted): a request to operate dehumidifying heating and to permit heating by HP operation Dehumidifying heating (outside air HP prohibited): a request to operate dehumidifying heating and to prohibit heating by HP operation Since only HP operation is prohibited, dehumidifying heating using an electric heater and dehumidifying heating using the exhaust heat of a battery are permitted.

Cooling: a request to activate cooling

Air conditioning OFF: a request to prohibit operation of all air conditioning (heating, cooling, and dehumidifying heating) This is requested when there is no air conditioning instruction from the user.

Correspondence Map

Next, with reference to FIGS. 6 to 8, correspondence maps showing the correspondence between the heat flow control requests and the path patterns will be described. The correspondence map is a map showing the path patterns that can be selected for each heat flow control request.

FIG. 6 is a diagram showing a correspondence map related to the path patterns of the low temperature cooling circuit LT. In FIG. 6, for each item of the first request, the second request, and the third request that are heat flow control requests, the path patterns that can be selected from the five types of the path patterns related to the low temperature cooling circuit LT shown in FIG. 5 are marked with a black circle. For example, when "Water flow requested" is requested as the first request, it is shown that any of the path patterns A-1, A-2, A-3, and B-1 can be selected. Further, when "Temperature rise permission" is requested as the second request, it is shown that only the path pattern A-2 can be selected. Further, when "Heating (outside air HP permitted)" is requested as the third request, it is shown that all the path patterns can be selected.

FIG. 7 is a diagram showing a correspondence map related to the path patterns of the refrigerant circuit RE. In FIG. 7, for each item of the first request, the second request, and the third request that are heat flow control requests, the path patterns that can be selected from the six types of the path patterns related to the refrigerant circuit RE shown in FIG. 4 are marked with a black circle. For example, when "Water flow requested" is requested as the first request, it is shown that all the path patterns can be selected. Further, when "Temperature rise permission" is requested as the second request, it is shown that either of the path pattern A-1 and the path pattern C-1 can be selected. Further, when "Heating (outside air HP permitted)" is requested as the third request, it is shown that any of the path patterns C-1, D-1, and D-2 can be selected.

FIG. 8 is a diagram showing a correspondence map related to the path patterns of the high temperature cooling circuit HT. In FIG. 8, for each item of the first request, the second request, and the third request that are heat flow control requests, the path patterns that can be selected from the six types of the path patterns related to the high temperature cooling circuit HT shown in FIG. 3 are marked with a black circle. For example, when "Water flow requested" is requested as the first request, it is shown that all the path patterns can be selected. Further, when "Temperature rise permission" is requested as the second request, it is shown that all the path patterns can be selected. Further, when "Heating (outside air HP permitted)" is requested as the third request, it is shown that any of the path patterns A-1, A-2, A-3, and B-1 can be selected.

Path Pattern Selection Control

Next, with reference to FIGS. 9 to 12, control for selecting a path pattern of each thermal circuit executed by the heat request arbitration device 10 will be described.

(1) Selection Control of Path Pattern of Low Temperature Cooling Circuit LT

Figure 9:
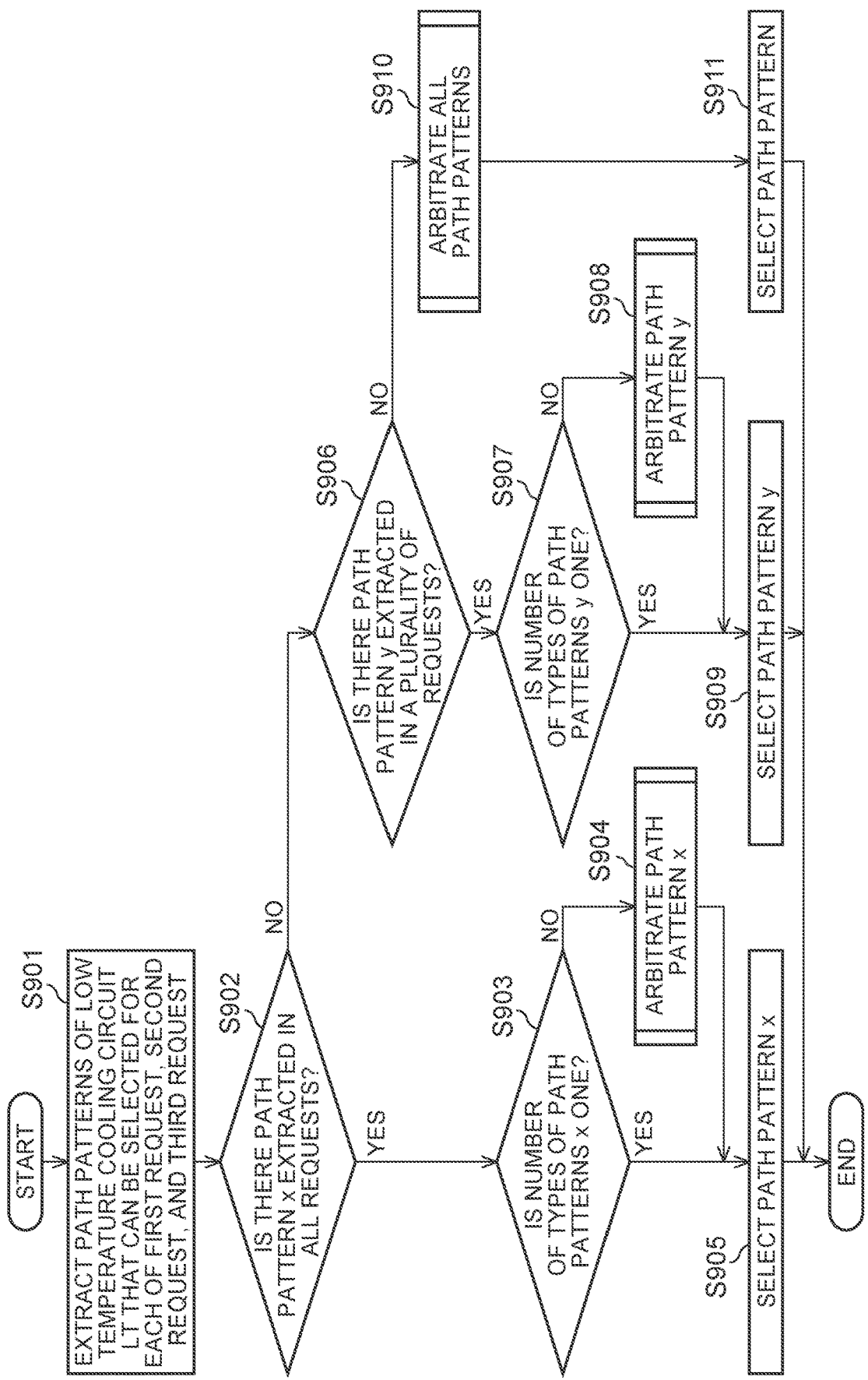
FIG. 9 is a process flowchart of selection control of the path patterns of the low temperature cooling circuit executed by a selection unit.
Figure 10:
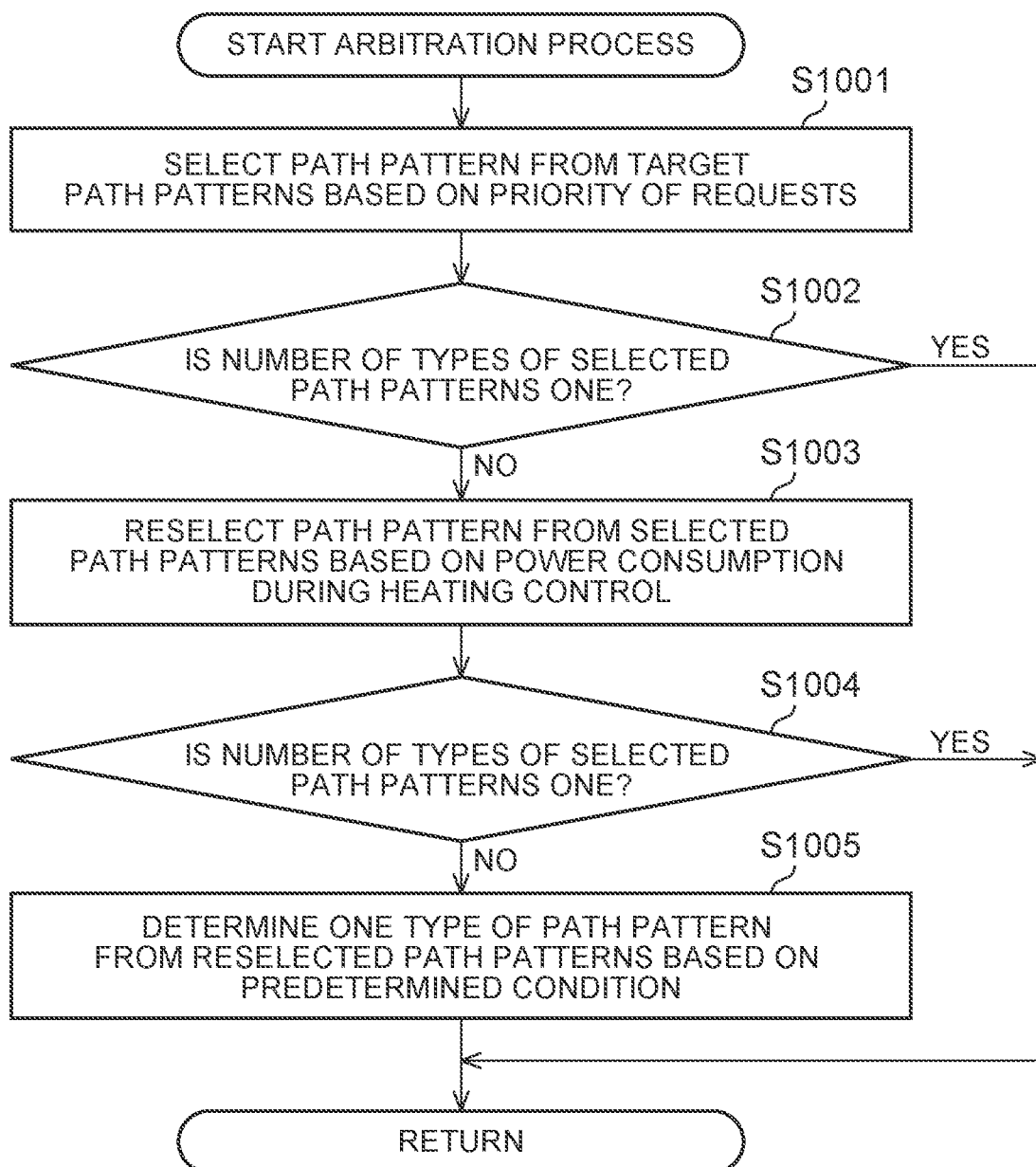
FIG. 10 is a process flowchart of the selection control of the path patterns of the low temperature cooling circuit executed by the selection unit.

FIG. 9 is a process flowchart indicating control for selecting the path pattern of the low temperature cooling circuit LT executed by the selection unit 13 of the heat request arbitration device 10. FIG. 10 is a detailed flowchart of the arbitration process performed in step S904, step S908, and step S910 in FIG. 9. The selection control shown in FIGS. 9 and 10 is started when the vehicle is started, and is repeatedly executed at predetermined time intervals until the operation of the vehicle is stopped.

Step S901

The selection unit 13 extracts the path patterns of the low temperature cooling circuit LT that can be selected for each of the first request, the second request, and the third request derived by the derivation unit 12. More specifically, the selection unit 13 extracts, based on the correspondence map in FIG. 6, all the path patterns of the low temperature cooling circuit LT that are selectable for the item of the first request, all the path patterns of the low temperature cooling circuit LT that are selectable for the item of the second request, and all the path patterns of the low temperature cooling circuit LT that are selectable for the item of the third request. When the path patterns of the low temperature cooling circuit LT corresponding to each request is extracted, the process proceeds to step S902.

Step S902

The selection unit 13 determines whether there is a path pattern (hereinafter referred to as "path pattern x") extracted in all the requests among all the path patterns extracted in step S901. That is, in the present embodiment, it is determined whether there is a path pattern x extracted in all of the first request, the second request, and the third request. When there is a path pattern x extracted in all the requests (S902: Yes), the process proceeds to step S903, and when there is no path pattern x extracted in all the requests (S902: No), the process proceeds to step S906.

Step S903

The selection unit 13 determines whether the number of types of the path patterns x extracted in all the requests determined in step S902 is one. When the number of types of the path patterns x is one (S903: Yes), the process proceeds to step S905, and when the number of types of the path patterns x is not one (S903: No), the process proceeds to step S904.

Step S904

The selection unit 13 performs an arbitration process (FIG. 10) for selecting one type of the path pattern x from a plurality of types of the path patterns x. This arbitration process will be described later. When the one type of the path pattern x is selected in the arbitration process, the process proceeds to step S905.

Step S905

The selection unit 13 selects the path pattern x for which only one type is extracted or the path pattern x narrowed down to one type in the arbitration process in step S904 as the path pattern that can easily satisfy the first request, the second request, and the third request. When the path pattern is selected, the selection control of the path pattern for the low temperature cooling circuit LT ends.

Step S906

The selection unit 13 determines whether there is a path pattern (hereinafter referred to as "path pattern y") extracted in a plurality of the requests among all the path patterns extracted in step S901. That is, in the present embodiment, it is determined whether there is a path pattern y extracted in two requests among the first request, the second request, and the third request. When there is a path pattern y extracted in a plurality of the requests (S906: Yes), the process proceeds to step S907, and when there is no path pattern y extracted in a plurality of the requests (S906: No), the process proceeds to step S910.

Step S907

The selection unit 13 determines whether the number of types of the path patterns y extracted in the plurality of the requests determined in step S906 is one. When the number of types of the path patterns y is one (S907: Yes), the process proceeds to step S909, and when the number of types of the path patterns y is not one (S907: No), the process proceeds to step S908.

Step S908

The selection unit 13 performs an arbitration process (FIG. 10) for selecting one type of the path pattern y from a plurality of types of the path patterns y. This arbitration process will be described later. When the one type of the path pattern y is selected in the arbitration process, the process proceeds to step S909.

Step S909

The selection unit 13 selects the path pattern y for which only one type is extracted or the path pattern y narrowed down to one type in the arbitration process in step S908 as the path pattern that can easily satisfy the first request, the second request, and the third request. When the path pattern is selected, the selection control of the path pattern for the low temperature cooling circuit LT ends.

Step S910

The selection unit 13 performs an arbitration process (FIG. 10) for selecting one type of the path pattern among all the path patterns extracted in step S901. This arbitration process will be described later. When the one type of path pattern is selected in the arbitration process, the process proceeds to step S911.

Step S911

The selection unit 13 selects the path pattern narrowed down to one type in the arbitration process in step S910 as the path pattern that can easily satisfy the first request, the second request, and the third request. When the path pattern is selected, the selection control of the path pattern for the low temperature cooling circuit LT ends.

The arbitration process performed in step S904, step S908, and step S910 in FIG. 9 will be described with reference to FIG. 10. In each step, only the path patterns to be arbitrated is different, and the content of the process executed for the target path patterns is the same. Specifically, in step S904, the path pattern x is the target of the arbitration, in step S908, the path pattern y is the target of the arbitration, and in step S910, all the path patterns are the targets of the arbitration.

Step S1001

The selection unit 13 selects a path pattern from the target path patterns based on the priority of the requests. Specifically, the path pattern extracted in the request having a high priority is preferentially selected. That is, the path pattern is selected so as to satisfy at least the request having a high priority. The priority of the first request, the second request, and the third request is predetermined and assigned thereto. As an example, it is possible to assign a priority in which the second request is prioritized over the third request and the first request is prioritized over the second request, that is, the priority of the first request is "high", the priority of the second request is "medium", and the priority of the third request is "low". Alternatively, it is also possible to assign a priority for the first, second, and third requests in which the first request is prioritized over the third request and the second request is prioritized over the first request, that is, the priority of the first request is "medium", the priority of the second request is "high", and the priority of the third request is "low". When the path pattern is selected based on the priority of the requests, the process proceeds to step S1002.

Step S1002

The selection unit 13 determines whether the number of types of the path patterns selected in step S1001 is one. When the number of types of the selected path patterns is one (S1002: Yes), the arbitration process ends (the process returns to each step in FIG. 9), and when the number of types of the selected path patterns is one or more (S1002: No), the process proceeds to step S1003.

Step S1003

The selection unit 13 reselects the path pattern from the path patterns selected in step S1001 based on the power consumption during heating control. Specifically, the path pattern that consumes the least amount of power during the heating control (having so-called high power efficiency) is reselected. As an example, heating by a heat pump using the heat of the outside air has higher power efficiency than heating by operating the electric heater 22, and heating by a heat pump using the exhaust heat of the battery 41 has even higher power efficiency. When the path pattern is reselected based on the power consumption (power efficiency) during the heating control, the process proceeds to step S1004.

Step S1004

The selection unit 13 determines whether the number of types of the path patterns reselected in step S1003 is one. When the number of types of the selected path patterns is one (S1004: Yes), the arbitration process ends (the process returns to each step in FIG. 9), and when the number of types of the selected path patterns is one or more (S1004: No), the process proceeds to step S1005.

Step S1005

The selection unit 13 determines one type of the path pattern from the path patterns reselected in step S1003 based on a predetermined condition. Examples of the predetermined condition include conditions for maximizing the power efficiency, such as whether the operation of the water pump 46 can be stopped without cooling the battery 41. When the one type of the path pattern is determined based on the predetermined condition, the arbitration process ends (the process returns to each step in FIG. 9).

(2) Selection Control of Path Pattern of Refrigerant Circuit RE

Figure 11:
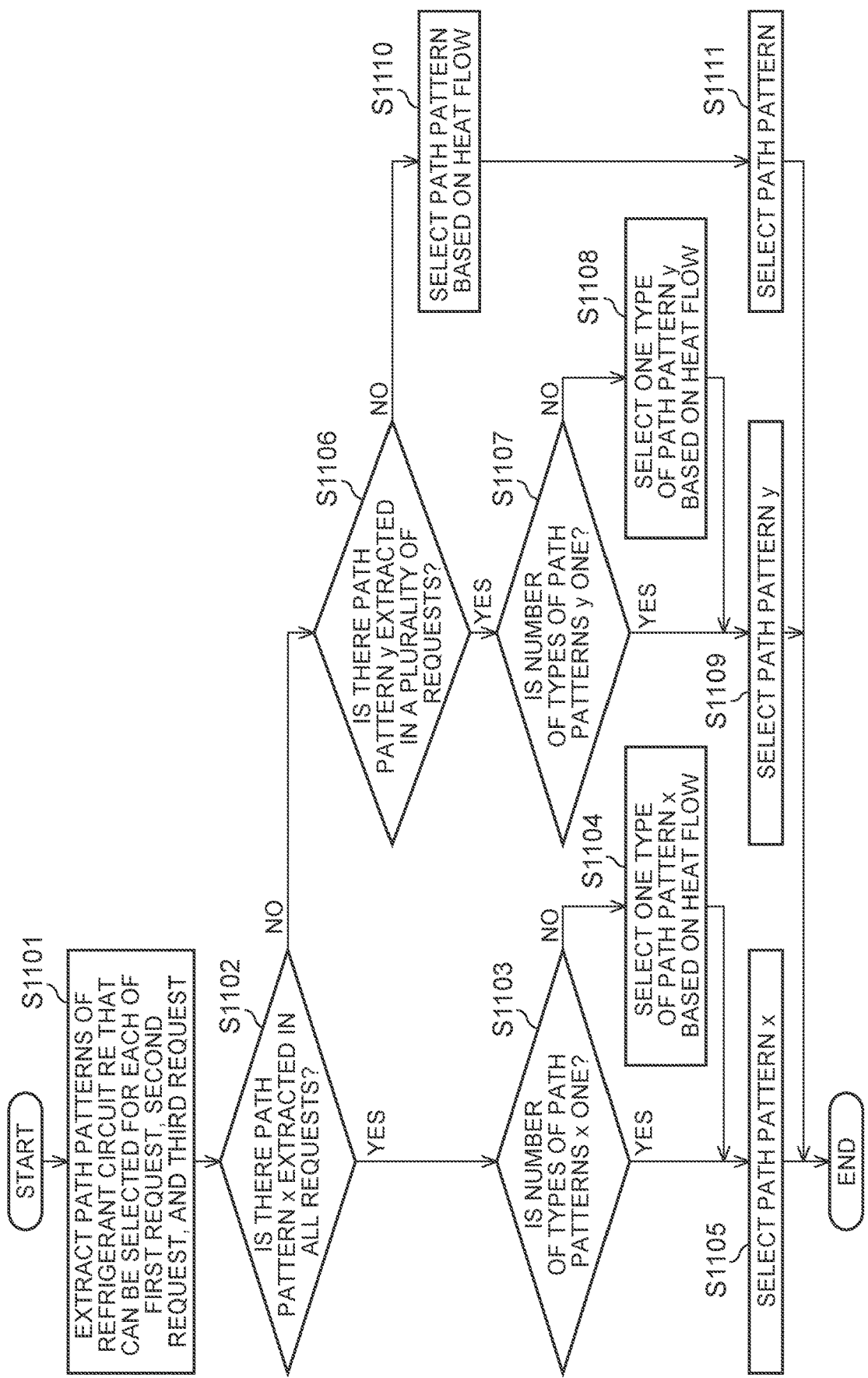
FIG. 11 is a process flowchart of selection control of the path patterns of the refrigerant circuit executed by the selection unit.

FIG. 11 is a process flowchart indicating control for selecting the path pattern of the refrigerant circuit RE executed by the selection unit 13 of the heat request arbitration device 10. The selection control shown in FIG. 11 is typically executed after the path pattern of the low temperature cooling circuit LT is selected in the selection control shown in FIGS. 9 and 10.

Step S1101

The selection unit 13 extracts the path patterns of the refrigerant circuit RE that can be selected for each of the first request, the second request, and the third request derived by the derivation unit 12. More specifically, the selection unit 13 extracts, based on the correspondence map in FIG. 7, all the path patterns of the refrigerant circuit RE that are selectable for the item of the first request, all the path patterns of the refrigerant circuit RE that are selectable for the item of the second request, and all the path patterns of the refrigerant circuit RE that are selectable for the item of the third request. When the path patterns of the refrigerant circuit RE corresponding to each request is extracted, the process proceeds to step S1102.

Step S1102

The selection unit 13 determines whether there is a path pattern x extracted in all the requests among all the path patterns extracted in step S1101. That is, in the present embodiment, it is determined whether there is a path pattern x extracted in all of the first request, the second request, and the third request. When there is a path pattern x extracted in all the requests (S1102: Yes), the process proceeds to step S1103, and when there is no path pattern x extracted in all the requests (S1102: No), the process proceeds to step S1106.

Step S1103

The selection unit 13 determines whether the number of types of the path patterns x extracted in all the requests determined in step S1102 is one. When the number of types of the path patterns x is one (S1103: Yes), the process proceeds to step S1105, and when the number of types of the path patterns x is not one (S1103: No), the process proceeds to step S1104.

Step S1104

The selection unit 13 selects one type of the path pattern x from a plurality of types of the path patterns x based on a heat flow. The heat flow refers to the exchange of heat generated between the low temperature cooling circuit LT located upstream of the heat transfer path and the refrigerant circuit RE. The selection unit 13 selects a path pattern x having a heat flow connection between the path patterns selected in the low temperature cooling circuit LT and the path patterns selected in the refrigerant circuit RE. Examples of cases where there is a heat flow connection include a case where the low temperature cooling circuit LT exhausts heat and the refrigerant circuit RE absorbs heat, and a case where the low temperature cooling circuit LT does not exhaust heat and the refrigerant circuit RE does not absorb heat. On the other hand, examples of cases where there is no heat flow connection include a case where the low temperature cooling circuit LT exhausts heat but the refrigerant circuit RE does not absorb heat, and a case where the low temperature cooling circuit LT does not exhaust heat but the refrigerant circuit RE absorbs heat. When the one type of the path pattern x is selected based on the heat flow, the process proceeds to step S1105.

Step S1105

The selection unit 13 selects the path pattern x for which only one type is extracted or the one type of the path pattern x selected in step S1104 as the path pattern that can easily satisfy the first request, the second request, and the third request. When the path pattern is selected, the selection control of the path pattern for the refrigerant circuit RE ends.

Step S1106

The selection unit 13 determines whether there is a path pattern y extracted in a plurality of the requests among all the path patterns extracted in step S1101. That is, in the present embodiment, it is determined whether there is a path pattern y extracted in two requests among the first request, the second request, and the third request. When there is a path pattern y extracted in a plurality of the requests (S1106: Yes), the process proceeds to step S1107, and when there is no path pattern y extracted in a plurality of the requests (S1106: No), the process proceeds to step S1110.

Step S1107

The selection unit 13 determines whether the number of types of the path patterns y extracted in the plurality of the requests determined in step S1106 is one. When the number of types of the path patterns y is one (S1107: Yes), the process proceeds to step S1109, and when the number of types of the path patterns y is not one (S1107: No), the process proceeds to step S1108.

Step S1108

The selection unit 13 selects one type of the path pattern y from a plurality of types of the path patterns y based on the heat flow. The heat flow is as described above. When the one type of the path pattern y is selected based on the heat flow, the process proceeds to step S1109.

Step S1109

The selection unit 13 selects the path pattern y for which only one type is extracted or the one type of the path pattern y selected in step S1108 as the path pattern that can easily satisfy the first request, the second request, and the third request. When the path pattern is selected, the selection control of the path pattern for the refrigerant circuit RE ends.

Step S1110

The selection unit 13 selects one type of the path pattern from all of the path patterns extracted in step S1101 above based on the heat flow. The heat flow is as described above. When the one type of the path pattern is selected based on the heat flow, the process proceeds to step S1111.

Step S1111

The selection unit 13 selects the one type of the path pattern selected in step S1110 above as the path pattern that can easily satisfy the first request, the second request, and the third request. When the path pattern is selected, the selection control of the path pattern for the refrigerant circuit RE ends.

(3) Selection Control of Path Pattern of High Temperature Cooling Circuit HT

Figure 12:
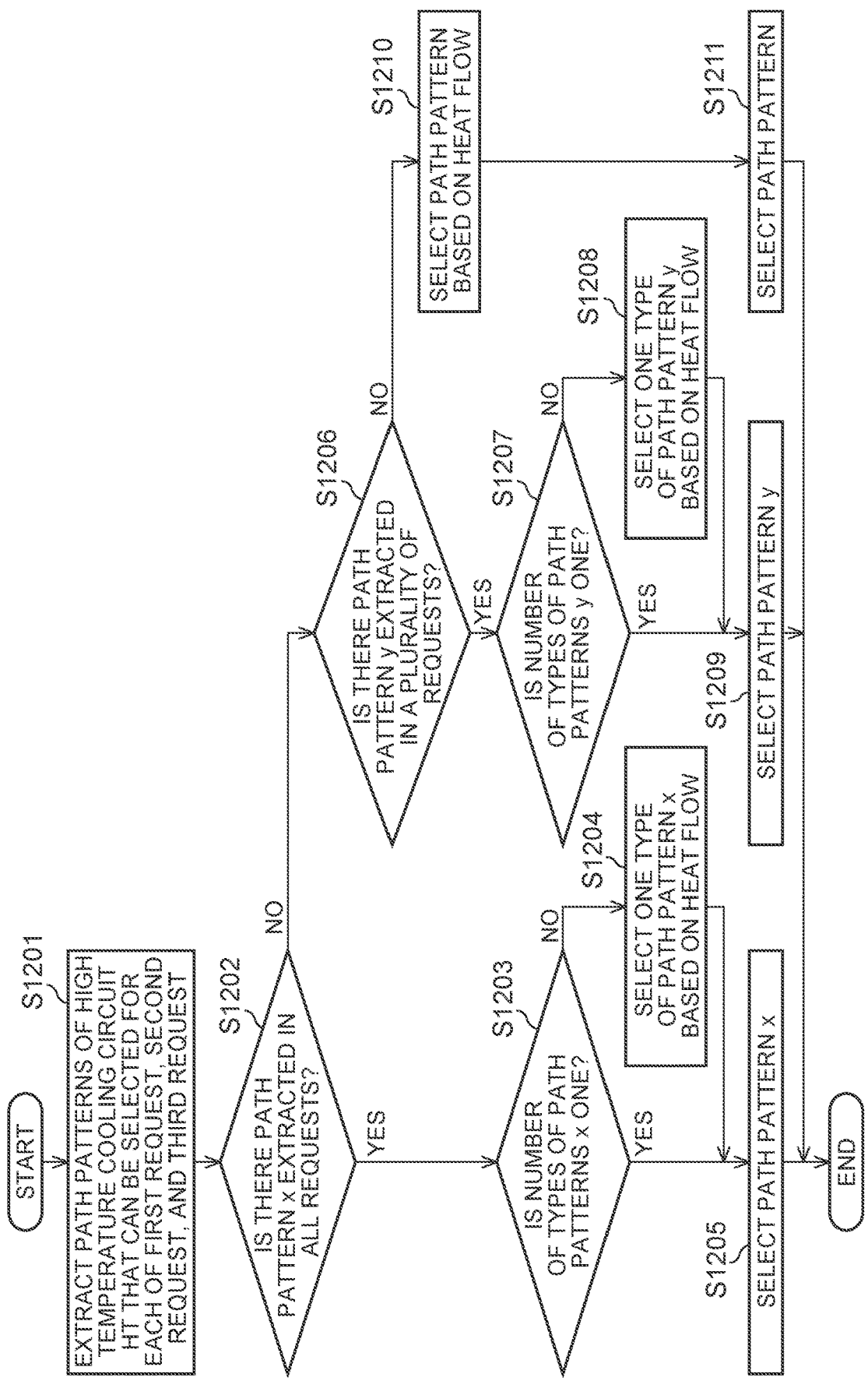
FIG. 12 is a process flowchart of selection control of the path patterns of the high temperature cooling circuit executed by the selection unit.

FIG. 12 is a process flowchart indicating control for selecting the path pattern of the high temperature cooling circuit HT executed by the selection unit 13 of the heat request arbitration device 10. The selection control shown in FIG. 12 is typically executed after the path pattern of the low temperature cooling circuit LT and the path pattern of the refrigerant circuit RE are selected in the selection control shown in FIGS. 9 to 11.

Step S1201

The selection unit 13 extracts the path patterns of the high temperature cooling circuit HT that can be selected for each of the first request, the second request, and the third request derived by the derivation unit 12. More specifically, the selection unit 13 extracts, based on the correspondence map in FIG. 8, all the path patterns of the high temperature cooling circuit HT that are selectable for the item of the first request, all the path patterns of the high temperature cooling circuit HT that are selectable for the item of the second request, and all the path patterns of the high temperature cooling circuit HT that are selectable for the item of the third request. When the path patterns of the high temperature cooling circuit HT corresponding to each request is extracted, the process proceeds to step S1202.

Step S1202

The selection unit 13 determines whether there is a path pattern x extracted in all the requests among all the path patterns extracted in step S1201. That is, in the present embodiment, it is determined whether there is a path pattern x extracted in all of the first request, the second request, and the third request. When there is a path pattern x extracted in all the requests (S1202: Yes), the process proceeds to step S1203, and when there is no path pattern x extracted in all the requests (S1202: No), the process proceeds to step S1206.

Step S1203

The selection unit 13 determines whether the number of types of the path patterns x extracted in all the requests determined in step S1202 is one. When the number of types of the path patterns x is one (S1203: Yes), the process proceeds to step S1205, and when the number of types of the path patterns x is not one (S1203: No), the process proceeds to step S1204.

Step S1204

The selection unit 13 selects one type of the path pattern x from a plurality of types of the path patterns x based on the heat flow. The heat flow refers to the exchange of heat generated between the refrigerant circuit RE located upstream of the heat transfer path and the high temperature cooling circuit HT. The selection unit 13 selects a path pattern x having a heat flow connection between the path patterns selected in the refrigerant circuit RE and the path patterns selected in the high temperature cooling circuit HT. Examples of cases where there is a heat flow connection include a case where the refrigerant circuit RE exhausts heat and the high temperature cooling circuit HT absorbs heat, and a case where the refrigerant circuit RE does not exhaust heat and the high temperature cooling circuit HT does not absorb heat. On the other hand, examples of cases where there is no heat flow connection include a case where the refrigerant circuit RE exhausts heat but the high temperature cooling circuit HT does not absorb heat, and a case where the refrigerant circuit RE does not exhaust heat but the high temperature cooling circuit HT absorbs heat. When the one type of the path pattern x is selected based on the heat flow, the process proceeds to step S1205.

Step S1205

The selection unit 13 selects the path pattern x for which only one type is extracted or the one type of the path pattern x selected in step S1204 as the path pattern that can easily satisfy the first request, the second request, and the third request. When the path pattern is selected, the selection control of the path pattern for the high temperature cooling circuit HT ends.

Step S1206

The selection unit 13 determines whether there is a path pattern y extracted in a plurality of the requests among all the path patterns extracted in step S1201. That is, in the present embodiment, it is determined whether there is a path pattern y extracted in two requests among the first request, the second request, and the third request. When there is a path pattern y extracted in a plurality of the requests (S1206: Yes), the process proceeds to step S1207, and when there is no path pattern y extracted in a plurality of the requests (S1206: No), the process proceeds to step S1210.

Step S1207

The selection unit 13 determines whether the number of types of the path patterns y extracted in the plurality of the requests determined in step S1206 is one. When the number of types of the path patterns y is one (S1207: Yes), the process proceeds to step S1209, and when the number of types of the path patterns y is not one (S1207: No), the process proceeds to step S1208.

Step S1208

The selection unit 13 selects one type of the path pattern y from a plurality of types of the path patterns y based on a heat flow. The heat flow is as described above. When the one type of the path pattern y is selected based on the heat flow, the process proceeds to step S1209.

Step S1209

The selection unit 13 selects the path pattern y for which only one type is extracted or the one type of the path pattern y selected in step S1208 as the path pattern that can easily satisfy the first request, the second request, and the third request. When the path pattern is selected, the selection control of the path pattern for the high temperature cooling circuit HT ends.

Step S1210

The selection unit 13 selects one type of the path pattern from all of the path patterns extracted in step S1201 above based on the heat flow. The heat flow is as described above. When the one type of the path pattern is selected based on the heat flow, the process proceeds to step S1211.

Step S1211

The selection unit 13 selects the one type of the path pattern selected in step S1210 above as the path pattern that can easily satisfy the first request, the second request, and the third request. When the path pattern is selected, the selection control of the path pattern for the high temperature cooling circuit HT ends.

SPECIFIC EXAMPLE

Next, specific examples of the path pattern of each thermal circuit that is selected based on the selection control shown in FIGS. 9 to 12 will be described with reference to FIGS. 13 to 15.

(1) FIRST EXAMPLE

FIG. 13 shows a first example in which the path pattern of each thermal circuit is selected in the case where "Water flow requested" is requested as the first request, "Temperature rise permission" is requested as the second request, and "Heating (outside air HP permitted)" is requested as the third request.

In the first example, in the low temperature cooling circuit LT, only the path pattern A-2 is the path pattern (extracted number: 3) extracted in all the requests. The path pattern A-2 is thus selected as the path pattern of the low temperature cooling circuit LT (double circle in the upper table in FIG. 13). In the refrigerant circuit RE, only the path pattern C-1 is the path pattern (extracted number: 3) extracted in all the requests. The path pattern C-1 is thus selected as the path pattern of the refrigerant circuit RE (double circle in the middle table in FIG. 13). In the high temperature cooling circuit HT, the path patterns A-1, A-2, A-3, and B-1 are the path patterns (extracted number: 3) extracted in all the requests (shaded portions in the lower table in FIG. 13), so that the heat flow in each path pattern is determined (process in step S1204 in FIG. 12). Since the refrigerant circuit RE does not exhaust heat in the path pattern C-1 selected in the refrigerant circuit RE, the path pattern A-1 that does not absorb heat regarding the heat flow connection is selected as the path pattern of the high temperature cooling circuit HT (double circle in the lower table in FIG. 13).

In this way, in the first example, the path pattern A-2 is selected as the low temperature cooling circuit LT, the path pattern C-1 is selected as the refrigerant circuit RE, and the path pattern A-1 is selected as the high temperature cooling circuit HT.

(2) SECOND EXAMPLE

FIG. 14 shows a second example in which the path pattern of each thermal circuit is selected in the case where "Water flow requested" is requested as the first request, "No restrictions" is requested as the second request, and "Heating (outside air HP permitted)" is requested as the third request.

In the second example, in the low temperature cooling circuit LT, the path patterns A-1, A-3, and B-1 are the path patterns (extracted number: 3) extracted in all the requests (shaded portions in the upper table in FIG. 14), so that the arbitration process of each path pattern is performed (process of step S904 in FIG. 9). In the arbitration process, based on the power efficiency during the heating control (process of step S1003 in FIG. 10), since heat pump heating using the exhaust heat of the battery 41 is available in the path pattern A-1 (in the path patterns A-3 and B-1, only heating by operating the electric heater is available), the path pattern A-1 is selected as the path pattern of the low temperature cooling circuit LT (double circle in the upper table in FIG. 14). In the refrigerant circuit RE, the path patterns C-1 and D-1 are the path patterns (extracted number: 3) extracted in all the requests (shaded portions in the middle table in FIG. 14), so that the heat flow in each path pattern is determined (process in step S1104 in FIG. 11). In the path pattern A-1 selected in the low temperature cooling circuit LT, since the low temperature cooling circuit LT exhausts heat, the path pattern D-1 that absorbs heat regarding the heat flow connection (that is, in which heat pump heating using the exhaust heat of the battery 41 is available) is selected as the path pattern of the refrigerant circuit RE (double circle in the middle table in FIG. 14). In the high temperature cooling circuit HT, the path patterns A-1, A-2, A-3, and B-1 are the path patterns (extracted number: 3) extracted in all the requests (shaded portions in the lower table in FIG. 14), so that the heat flow in each path pattern is determined (process in step S1204 in FIG. 12). In the path pattern D-1 selected in the refrigerant circuit RE, since the refrigerant circuit RE exhausts heat, three types of the path patterns A-2, A-3, and B-1 that absorb heat regarding the heat flow connection are selected as the path patterns of the high temperature cooling circuit HT (circles in the lower table in FIG. 14). The three types of the selected path patterns are used by appropriately being switched to any optimal one type of the path pattern depending on the amount of heat transferred from the refrigerant circuit RE to the high temperature cooling circuit HT via the water cooling condenser 33 during the heat pump heating using the exhaust heat of the battery 41.

In this way, in the second example, the path pattern A-1 is selected as the low temperature cooling circuit LT, the path pattern D-1 is selected as the refrigerant circuit RE, and one of the path patterns A-2, A-3, and B-1 is selected as the high temperature cooling circuit HT.

(3) THIRD EXAMPLE

FIG. 15 shows a third example in which the path pattern of each thermal circuit is selected in the case where "No water flow requested" is requested as the first request, "Temperature equalization (use of exhaust heat permitted)" is requested as the second request, and "Cooling" is requested as the third request.

In a third example, in the low temperature cooling circuit LT, the path patterns A-1 and A-3 are the path patterns (extracted number: 3) extracted in all the requests (shaded portions in the upper table in FIG. 15), so that the arbitration process of each path pattern is performed (process of step S904 in FIG. 9). In the arbitration process, based on the power efficiency considering the cooling efficiency (process of step S1003 in FIG. 10), since the chiller 34 does not need to exhaust heat in the path pattern A-3, the path pattern A-3 is selected as the path pattern of the low temperature cooling circuit LT (double circle in the upper table in FIG. 15). In the refrigerant circuit RE, only the path pattern A-1 is the path pattern (extracted number: 3) extracted in all the requests. The path pattern A-1 is thus selected as the path pattern of the refrigerant circuit RE (double circle in the middle table in FIG. 15). In the high temperature cooling circuit HT, only the path pattern C-1 is the path pattern (extracted number: 3) extracted in all the requests. The path pattern C-1 is thus selected as the path pattern of the high temperature cooling circuit HT (double circle in the lower table in FIG. 15).

In this way, in the third example, the path pattern A-3 is selected as the low temperature cooling circuit LT, the path pattern A-1 is selected as the refrigerant circuit RE, and the path pattern C-1 is selected as the high temperature cooling circuit HT.

Operations and Effects

As described above, the heat request arbitration device 10 according to the embodiment of the present disclosure selects the circulation path of the heat medium in each of the low temperature cooling circuit LT, the refrigerant circuit RE, and the high temperature cooling circuit HT from a plurality of predetermined path patterns based on a plurality of heat flow control requests (the first request, the second request, and the third request). The selection control enables suitable heat flow control that can easily satisfy a plurality of heat flow control requests.

Further, in the heat request arbitration device 10 according to the present embodiment, even when the system configurations of the thermal circuits are changed (for example, in the case of a system composed of the refrigerant circuit RE and the high temperature cooling circuit HT), it is possible to select appropriate path patterns using only the correspondence maps of the thermal circuits included in the system.

Further, in the heat request arbitration device 10 according to the present embodiment, it is possible to include in the items of each heat flow control request an item corresponding to fail-safe measures in case a failure or abnormality occurs in a unit or the like of each thermal circuit. By including the item corresponding to the fail-safe measures as necessary, it is possible to perform heat flow control that is suitable for a plurality of heat flow control requests while satisfying unit failure requirements.

Further, in the heat request arbitration device 10 according to the present embodiment, even when the number of the path patterns that can be selected for the thermal circuits increases, the number of the heat flow control requests to be derived increases, or the number of items of the heat flow control requests increases, it is only necessary to update the correspondence map for each thermal circuit according to the increased content, thereby having excellent versatility.

Although the embodiment of the present disclosure has been described above, the present disclosure can be applied to a heat request arbitration device, a path pattern selection method executed by a heat request arbitration device including a processor and a memory, a control program for executing a path pattern selection method, a computer-readable non-transitory storage medium that stores a control program, and a vehicle equipped with a heat request arbitration device.

The heat request arbitration device of the present disclosure can be used to control heat flow in a plurality of thermal circuits provided in a vehicle.

What is claimed is:

1. A heat request arbitration device mounted on a vehicle, the heat request arbitration device comprising:
    a first thermal circuit having a plurality of path patterns that are selectable as a path configured to circulate a coolant at a high temperature;
    a second thermal circuit having a plurality of path patterns that are selectable as a path configured to circulate a coolant at a low temperature;
    a third thermal circuit having a plurality of path patterns that are selectable as a path that is heat exchangeable with each of the first thermal circuit and the second thermal circuit by circulating a refrigerant while changing a state of the refrigerant;
    a plurality of heat source units configured to absorb heat or radiate heat via a heat medium circulating in at least one of the first thermal circuit, the second thermal circuit, and the third thermal circuit;
    a derivation unit configured to derive a plurality of requests related to heat flow control of heat absorbed or radiated by each of the heat source units; and
    a selection unit configured to select a path for at least one of the first thermal circuit, the second thermal circuit, and the third thermal circuit so as to satisfy at least one of the requests related to the heat flow control based on the requests related to the heat flow control derived by the derivation unit, wherein the selection unit is configured to make a selection based on electric power consumed by the heat source units.

2. The heat request arbitration device according to claim 1, wherein:
    the first thermal circuit and the third thermal circuit are coupled via a first heat exchanger;
    the second thermal circuit and the third thermal circuit are coupled via a second heat exchanger; and
    the selection unit is configured to select at least one mode of heat transfer control of the first heat exchanger and the second heat exchanger so as to satisfy at least one of the requests related to the heat flow control based on the requests related to the heat flow control derived by the derivation unit.

3. The heat request arbitration device according to claim 1, wherein the derivation unit is configured to derive a plurality of requests related to states of the heat source units that differ from each other and that are mounted on the vehicle as the requests related to the heat flow control.

4. The heat request arbitration device according to claim 3, wherein the requests related to the heat flow control include at least a first request, a second request, and a third request, the first request being a request for a water flow state of a radiator that is one of the heat source units, the second request being a request for a temperature state of a battery that is one of the heat source units, and the third request being a request for an air-conditioning state in a vehicle cabin that involves at least an operation of an evaporator that is one of the heat source units.

5. The heat request arbitration device according to claim 4, wherein:
    a priority is given to each of the first request, the second request, and the third request; and
    the selection unit is configured to make a selection based on the priority so as to satisfy at least a request having a higher priority.

6. The heat request arbitration device according to claim 5, wherein the priority is higher in the second request than in the third request, and is higher in the first request than in the second request.

7. A heat request arbitration method executed by a computer of a heat request arbitration device mounted on a vehicle including a first thermal circuit, a second thermal circuit, a third thermal circuit, and a plurality of heat source units, the first thermal circuit having a plurality of path patterns that are selectable as a path configured to circulate a coolant at a high temperature, the second thermal circuit having a plurality of path patterns that are selectable as a path configured to circulate a coolant at a low temperature, the third thermal circuit having a plurality of path patterns that are selectable as a path that is heat exchangeable with each of the first thermal circuit and the second thermal circuit by circulating a refrigerant while changing a state of the refrigerant, the heat source units being configured to absorb heat or radiate heat via a heat medium circulating in at least one of the first thermal circuit, the second thermal circuit, and the third thermal circuit, the heat request arbitration method comprising:
    deriving a plurality of requests related to heat flow control of heat absorbed or radiated by each of the heat source units; and
    selecting, based on electric power consumed by the heat source units, a path for at least one of the first thermal circuit, the second thermal circuit, and the third thermal circuit so as to satisfy at least one of the requests related to the heat flow control based on the requests related to the heat flow control that are derived.

8. A non-transitory storage medium storing instructions that are executable by one or more processors of a heat request arbitration device mounted on a vehicle including a first thermal circuit, a second thermal circuit, a third thermal circuit and a plurality of heat source units, and the instructions that cause the one or more processors to perform functions, the first thermal circuit having a plurality of path patterns that are selectable as a path configured to circulate a coolant at a high temperature, the second thermal circuit having a plurality of path patterns that are selectable as a path configured to circulate a coolant at a low temperature, the third thermal circuit having a plurality of path patterns that are selectable as a path that is heat exchangeable with each of the first thermal circuit and the second thermal circuit by circulating a refrigerant while changing a state of the refrigerant; and the heat source units being configured to absorb heat or radiate heat via a heat medium circulating in at least one of the first thermal circuit, the second thermal circuit, and the third thermal circuit, the functions comprising:

deriving a plurality of requests related to heat flow control of heat absorbed or radiated by each of the heat source units; and selecting, based on electric power consumed by the heat source units, a path for at least one of the first thermal circuit, the second thermal circuit, and the third thermal circuit so as to satisfy at least one of the requests related to the heat flow control based on the requests related to the heat flow control that are derived.

9. A vehicle comprising a heat request arbitration device including:

a first thermal circuit having a plurality of path patterns that are selectable as a path configured to circulate a coolant at a high temperature;

a second thermal circuit having a plurality of path patterns that are selectable as a path configured to circulate a coolant at a low temperature;

a third thermal circuit having a plurality of path patterns that are selectable as a path that is heat exchangeable with each of the first thermal circuit and the second thermal circuit by circulating a refrigerant while changing a state of the refrigerant;

a plurality of heat source units configured to absorb heat or radiate heat via a heat medium circulating in at least one of the first thermal circuit, the second thermal circuit, and the third thermal circuit;

a derivation unit configured to derive a plurality of requests related to heat flow control of heat absorbed or radiated by each of the heat source units; and a selection unit configured to select a path for at least one of the first thermal circuit, the second thermal circuit, and the third thermal circuit so as to satisfy at least one of the requests related to the heat flow control based on the requests related to the heat flow control derived by the derivation unit, wherein the selection unit is configured to make a selection based on electric power consumed by the heat source units.

* * * * *